United States Patent
Todoroki et al.

(10) Patent No.: US 7,685,535 B2
(45) Date of Patent: Mar. 23, 2010

(54) INFORMATION PROCESSING APPARATUS, METHOD, AND INFORMATION PROCESSING PROGRAM

(75) Inventors: Kaneo Todoroki, Kanagawa (JP); Claus Hoefele, New South Wales (AU); Tao Qin, Kanagawa (JP)

(73) Assignee: Sony Ericsson Mobile Communications AB, Lund (SE)

( * ) Notice: Subject to any disclaimer, the term of this patent is extended or adjusted under 35 U.S.C. 154(b) by 386 days.

(21) Appl. No.: 11/696,935

(22) Filed: Apr. 5, 2007

(65) Prior Publication Data

US 2007/0240054 A1 Oct. 11, 2007

(30) Foreign Application Priority Data

Apr. 10, 2006 (JP) ............................ P2006-107399

(51) Int. Cl.
*G06F 3/00* (2006.01)
(52) U.S. Cl. .................. 715/853; 715/765; 715/788
(58) Field of Classification Search ................ 715/764, 715/765, 781, 788, 835, 853
See application file for complete search history.

(56) References Cited

U.S. PATENT DOCUMENTS 5,590,265 A    12/1996  Nakazawa 6,292,187 B1 *  9/2001  Gibbs et al. .................. 715/804
2004/0133853 A1  7/2004  Poerner et al.
2006/0259875 A1 * 11/2006  Collins et al. ............... 715/853

FOREIGN PATENT DOCUMENTS

JP       08-212042       8/1996
JP      2000-347782     12/2000

* cited by examiner

*Primary Examiner*—X. L Bautista
(74) *Attorney, Agent, or Firm*—Oblon, Spivak, McClelland, Maier & Neustadt, L.L.P.

(57) ABSTRACT

An information processing apparatus includes: a display section provided with a screen capable of displaying a content of an application; a user-input processing section for acquiring an instruction input from a user; and a screen-hierarchy control section for managing a screen hierarchical order of each application when contents of a plurality of started applications are displayed in the display section. When one of at least two applications of a plurality out of the applications is set to be a master application and the other of the applications is set to be a slave application, the screen-hierarchy control section disposes and links the slave application at an immediately lower level than that of the master application in the screen hierarchy, and performs screen-hierarchy control such that the master application and the slave application are moved in the screen hierarchy in a state being linked at the time of updating the screen hierarchy.

15 Claims, 19 Drawing Sheets

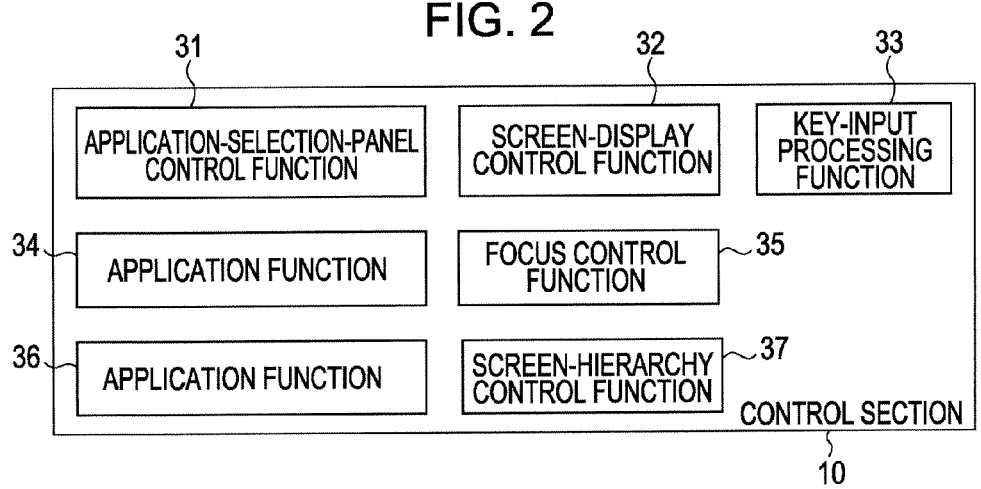
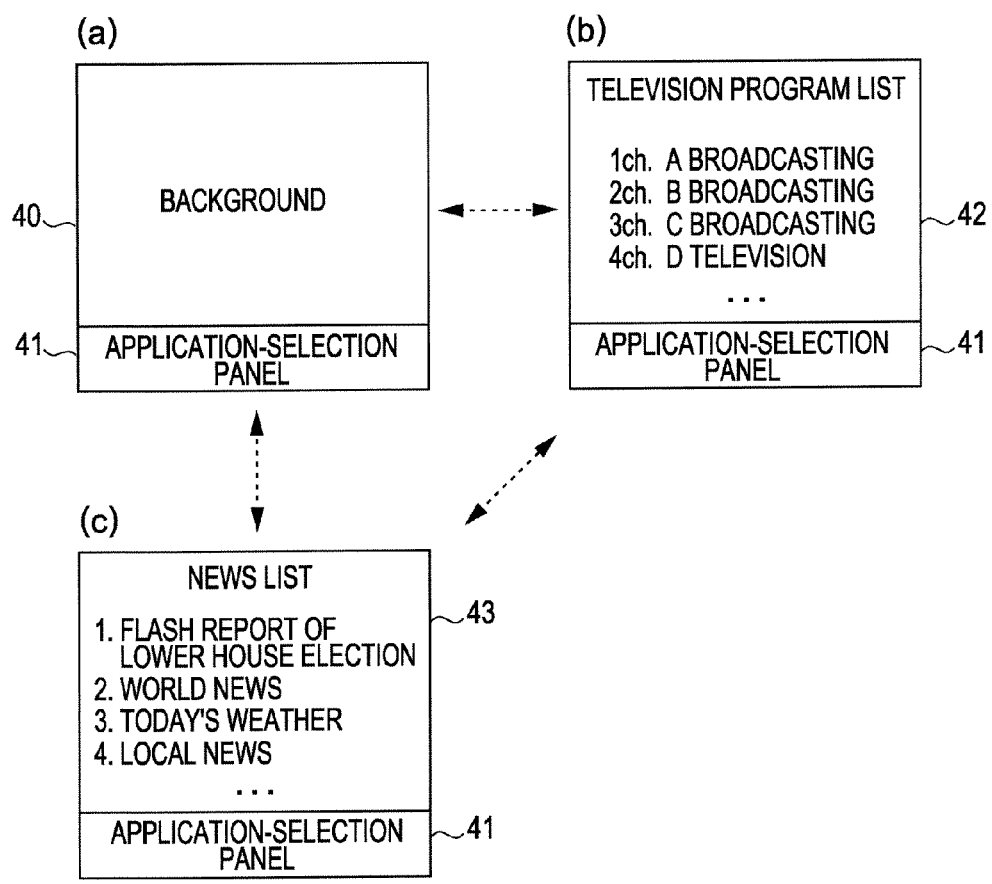

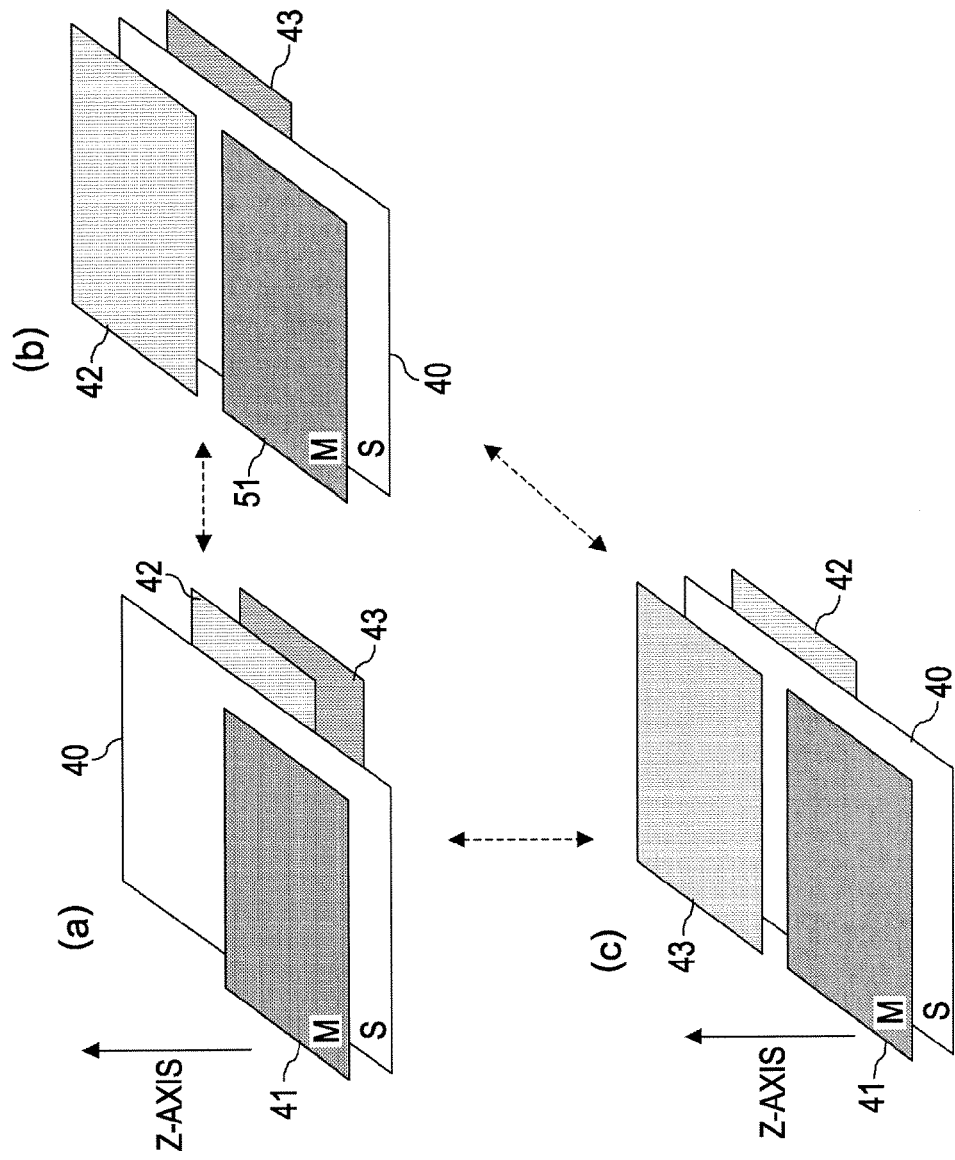

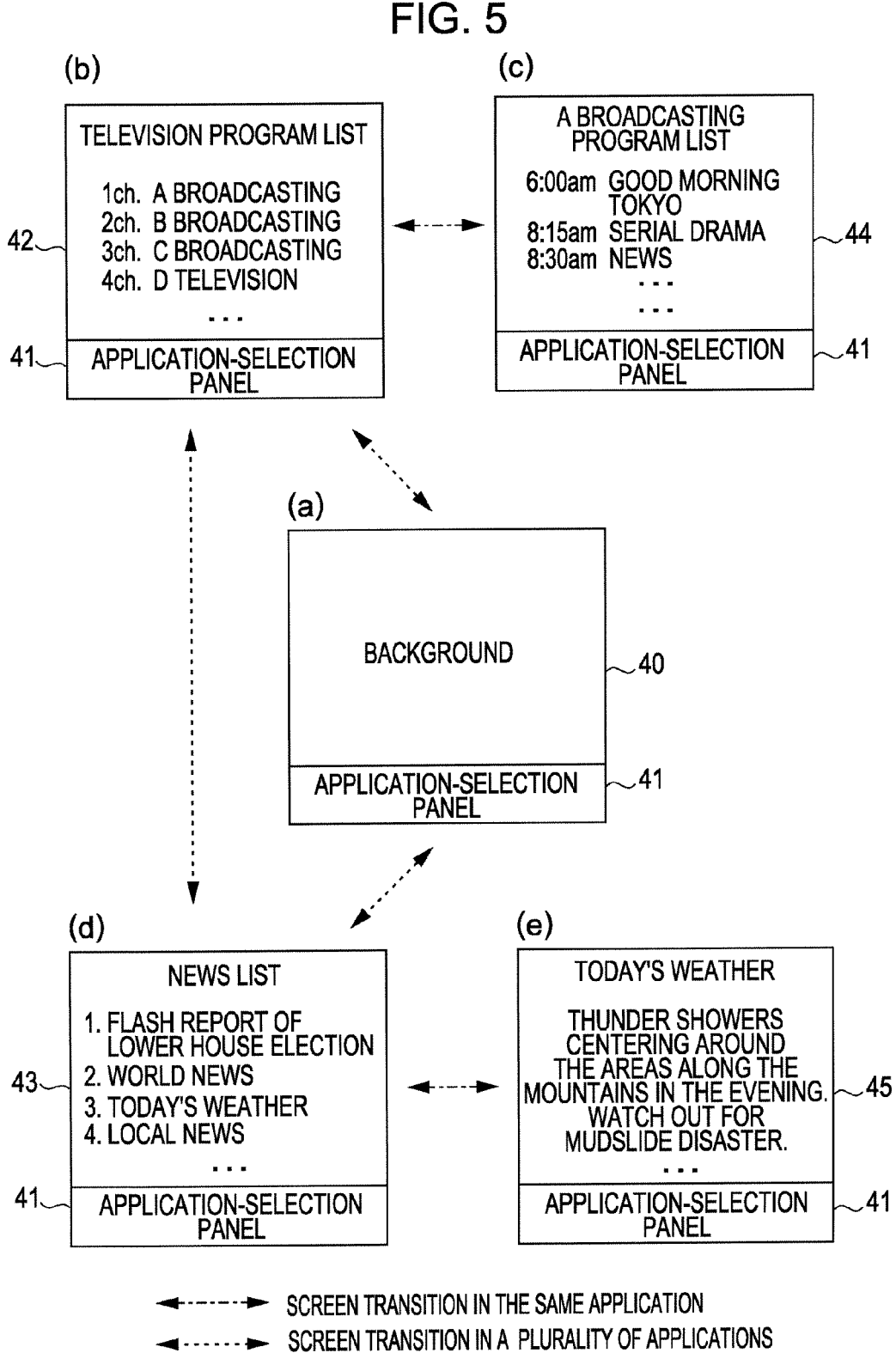

FIG. 18

| APPLICATION NUMBER | HIERARCHICAL ORDER | APPLICATION NUMBER OF MASTER SIDE | APPLICATION NUMBER OF SLAVE SIDE | LINK TO MASTER APPLICATION SPECIFIC INFORMATION | LINK TO SLAVE APPLICATION SPECIFIC INFORMATION |
|---|---|---|---|---|---|
| W1 | 3 | | | | |
| W2 | 2 | | | | |
| W3 | 4 | | W4 | | LINK INFORMATION TO INTERFACE OF SLAVE APPLICATION |
| W4 | 5 | W3 | | LINK INFORMATION TO INTERFACE OF MASTER APPLICATION | |
| W5 | 1 | | | | |

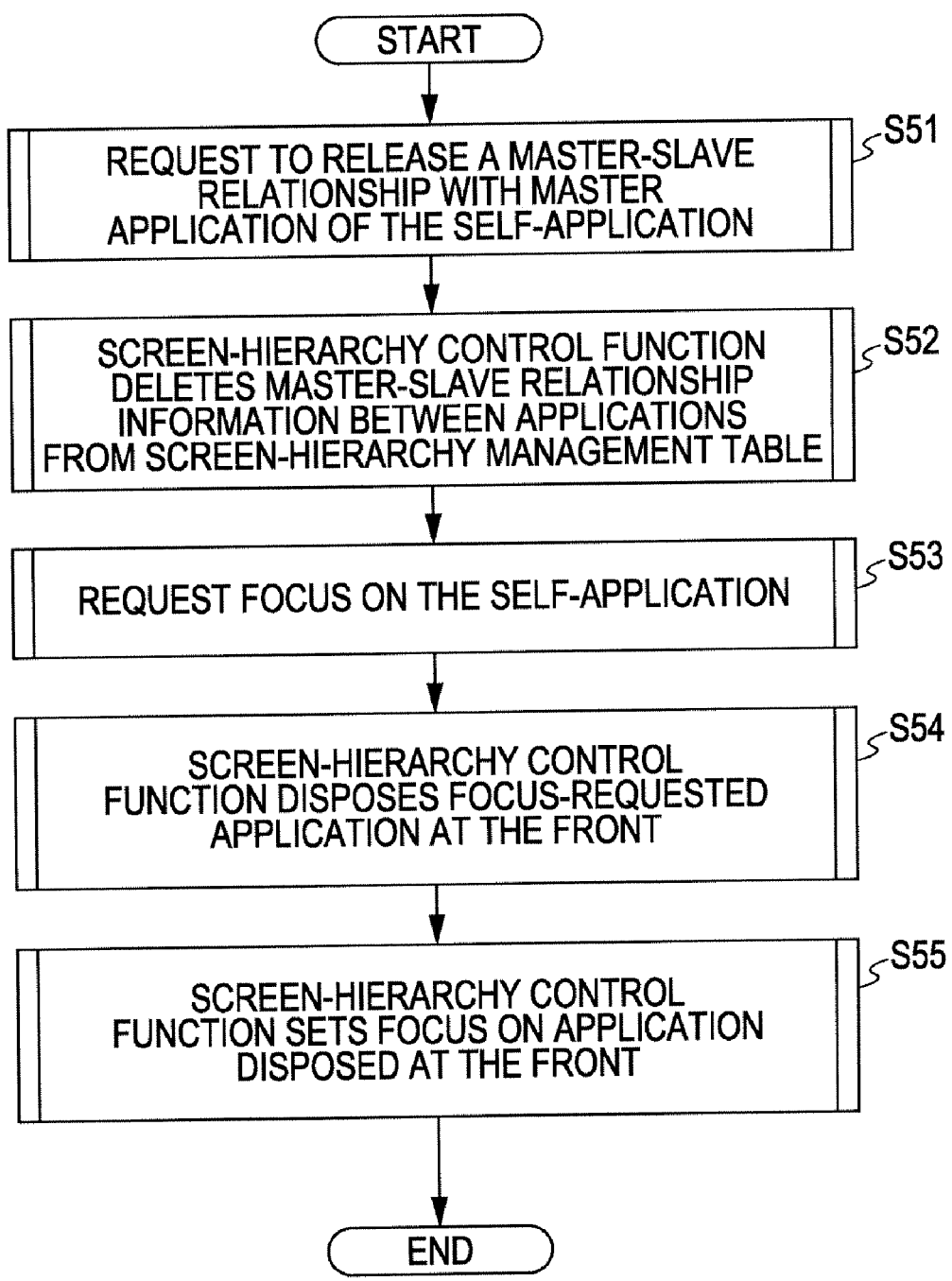

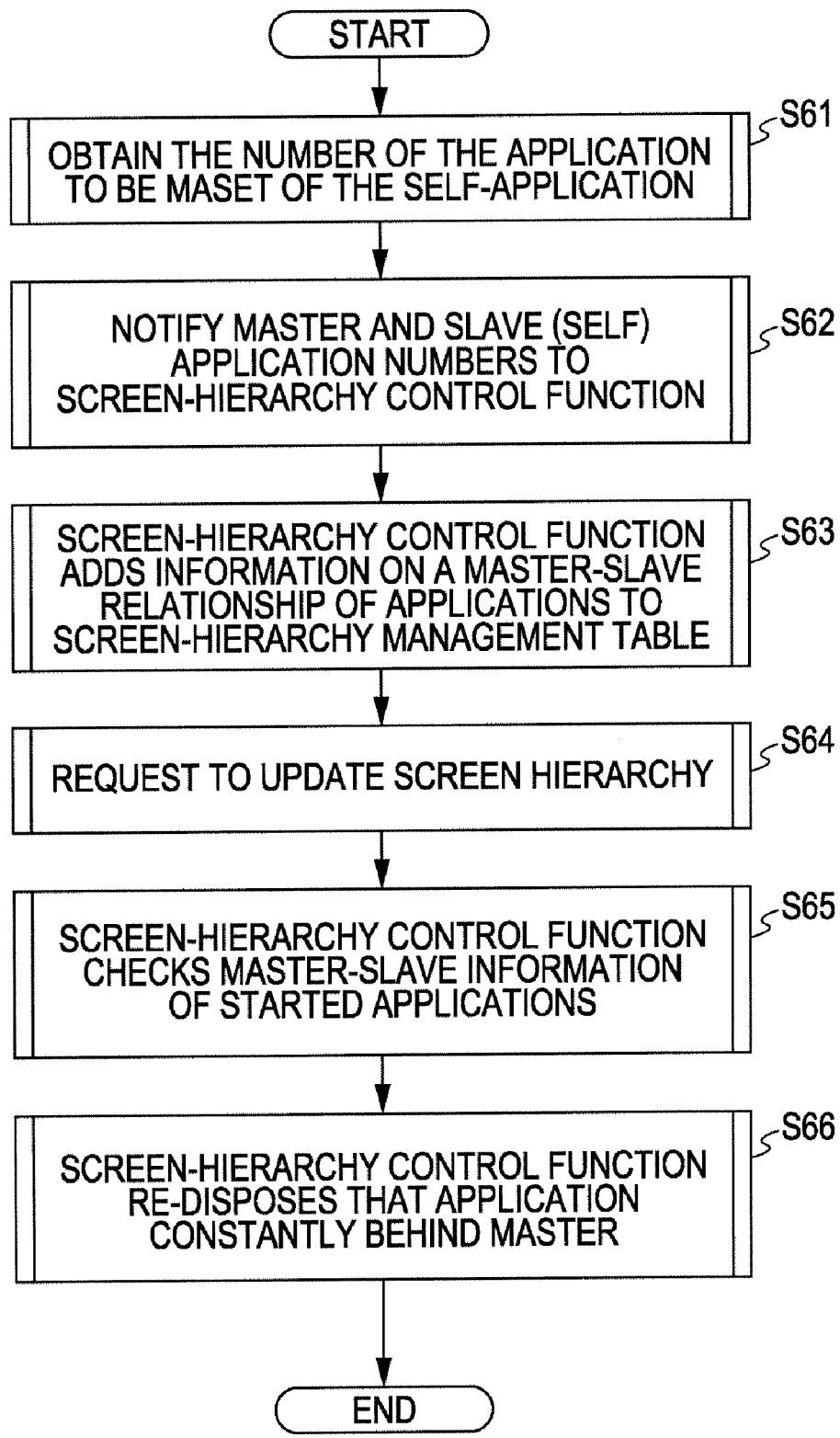

INFORMATION PROCESSING APPARATUS, METHOD, AND INFORMATION PROCESSING PROGRAM

CROSS REFERENCES TO RELATED APPLICATIONS

The present invention contains subject matter related to Japanese Patent Application JP 2006-107399 filed in the Japanese Patent Office on Apr. 10, 2006, the entire contents of which are incorporated herein by reference.

BACKGROUND OF THE INVENTION

1. Field of the Invention

The present invention relates to an information processing apparatus, method, and an information processing program, which are capable of changing and using a plurality of applications.

2. Description of the Related Art

To date, a method of changing and using a plurality of applications in an information processing apparatus, such as a cellular-phone terminal, has been known as follows:

(1) A method of displaying a screen showing a list of applications once, and starting the application selected by the user from that list (2) A method of providing each application with a mutual linkage function, and starting another application from a certain application by those application linkage functions (3) A method of providing each application with a mutual linkage function, and directly using another application function from a certain application by those application linkage functions.

Also, Japanese Unexamined Patent Application Publication No. 2000-347782 (refer to FIGS. 4, 5, and 7) has disclosed an electronic system in which when displays are changed in two ways between a first display screen showing one function and a second display screen showing another function, the display modes at screen-change time are controlled on the basis of a hierarchical relationship between a level including one function and a level including another function. By the technique described in the above publication, in a mobile electronic system having a smaller display screen in a list-type mobile information processing apparatus, etc., in particular, including a plurality of functions in multiple layers, the user is allowed to visually know an operation state or a selection state with ease, thereby improving the operationality.

SUMMARY OF THE INVENTION

Among the above-described methods of changing a plurality of applications, in the case of the method described in (1), for example it is relatively easily possible to implement a mechanism necessary for the application linkage. However, for example when applications are changed, the method has a defect in that the on-going operation of the user needs to be suspended.

Also, in the case of the method described in (2), it is relatively easy to proceed to a link in one direction. However, there is a drawback in the link in the opposite direction. That is to say, for example, when the user has started application B from application A, and tries to see the screen of application A again, it is necessary for the user to display a multi-task menu, etc., on the screen once, and then to explicitly select the started application A. Thus, this method has the same defect as in the case (1) described above.

Also, in the case of the method described in (3), it is relatively easy to proceed to a link in two directions. However, in order to implement such a linkage function, it is necessary for each application to dynamically incorporate a function of directly using another application. Thus, as compared with the above-described methods of (1) and (2), there is a defect in that the software mechanism becomes more complicated.

The present invention has been made in view of such a situation. It is desirable to provide an information processing apparatus, method, and an information processing program, which enables the user to change a plurality of applications in two ways seamlessly and promptly without interrupting the user's operation at the time of changing applications by a simple software mechanism.

According to an embodiment of the present invention, there is provided an information processing apparatus including: a display section provided with a screen capable of displaying a content of an application; a user-input processing section for acquiring an instruction input from a user; and a screen-hierarchy control section for managing a screen hierarchical order of each application when contents of a plurality of started applications are displayed in the display section, wherein when one of at least two applications out of a plurality of the applications is set to be a master application and the other of the applications is set to be a slave application, the screen-hierarchy control section disposes and links the slave application at an immediately lower level than that of the master application in the screen hierarchy, and performs screen-hierarchy control such that the master application and the slave application are moved in the screen hierarchy in a state of being linked at the time of updating the screen hierarchy.

According to another embodiment of the present invention, there is provided a method of processing information, including the steps of: managing a screen hierarchical order of each application when contents of a plurality of started applications are displayed on a screen of a display section; when one of at least two applications out of a plurality of the applications is set to be a master application and the other of the applications is set to be a slave application, disposing and linking the slave application at an immediately lower level than that of the master application in the screen hierarchy; and moving the master application and the slave application in a state of being linked at the time of updating the screen hierarchy.

According to another embodiment of the present invention, there is provided an information processing program for causing a computer to perform processing as a screen-hierarchy control section, the processing including the steps of: managing a screen hierarchical order of each application when contents of a plurality of started applications are displayed on a screen of a display section; when one of at least two applications out of a plurality of the applications is set to be a master application and the other of the applications is set to be a slave application, disposing and linking the slave application at an immediately lower level than that of the master application in the screen hierarchy; and moving the master application and the slave application in a state of being linked at the time of updating the screen hierarchy.

That is to say, by the present invention, a plurality of applications are managed in a screen hierarchy, and thus the applications are changed by changing the contents displayed on the screen. Also, by the present invention, the screen-hierarchy control section manages the applications in a state of linking a master and a slave, and the master and the slave applications are moved in the screen hierarchy in a linked state. Thus, it is not necessary for the master and the slave applications to incorporate complicated software for the mutual linkage.

By the present invention, a plurality of applications are managed in a screen hierarchy, and the applications are managed in a state of being linked as a master and a slave. Also, the screen-hierarchy control is performed such that the both applications are moved in the screen hierarchy in a linked state. It is therefore possible for the user to change a plurality of applications in two ways seamlessly and promptly by a simple software mechanism without interrupting the user's operation at the time of changing applications.

BRIEF DESCRIPTION OF THE DRAWINGS

FIG. 2 is a block diagram illustrating each function for executing and controlling an application, controlling changing applications, etc., in the control section of the cellular-phone terminal according to the present embodiment;

FIG. 3 is a diagram illustrating an example of screen transitions when the contents of a plurality of applications are changed in a first embodiment;

FIG. 4 is a three-dimensional diagram illustrating an example of the hierarchical transitions of each application in the example of screen transitions in FIG. 3;

FIG. 5 is a diagram illustrating an example of screen transitions when the contents of a plurality of applications are changed and the contents of the same application are changed in the first embodiment;

FIG. 18 is a diagram illustrating an example of a screen-hierarchy management table;

FIG. 21 is a processing flowchart illustrating the case where a master-slave relationship is released by the selection of a content of the slave application, and the slave application is moved to the highest level in the screen hierarchy to be focused; and FIG. 22 is a processing flowchart illustrating the case where a master-slave relationship is released once, and then the slave application restores the master-slave relationship with the master application again.

DESCRIPTION OF THE PREFERRED EMBODIMENTS

In the following, a description will be given of an information processing apparatus, method, and an information processing program according to an embodiment of the present invention with reference to the drawings.

In this regard, in the present embodiment, a cellular-phone terminal is taken as an example of an information processing apparatus to which a method of processing information and an information processing program according to the present invention are applied. However, the contents described here are taken by way of example as a matter of course. It goes without saying that the present invention is not limited to this example.

Internal Configuration of Cellular-Phone Terminal

Figure 1:
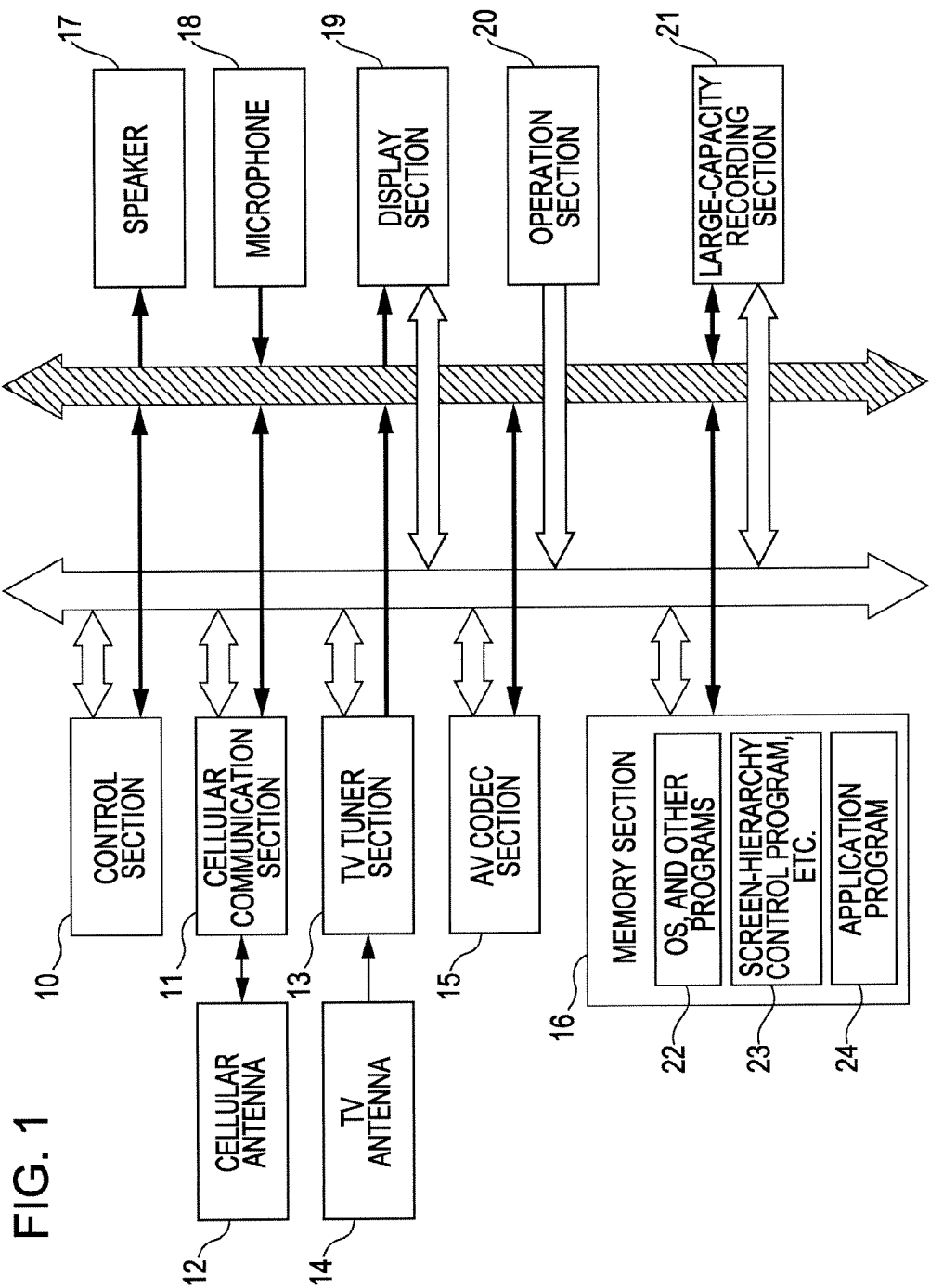
FIG. 1 is a block diagram schematically illustrating the internal configuration of a cellular-phone terminal according to an embodiment of the present invention.

FIG. 1 schematically illustrates an internal circuit configuration of a cellular-phone terminal of the present embodiment.

In FIG. 1, a data line is a transmission line for transmitting various kinds of data, such as voice data, email data, image data, etc. A control line is a transmission line for transmitting various kinds of control information, such as control data from a control section 10 including a CPU (Central Processing Unit), etc.

A cellular antenna 12 is an antenna for transmitting and receiving signal waves with base stations of a cellular telephone network, and is connected to a cellular communication section 11. The cellular communication section 11 performs the frequency conversion, modulation, demodulation, etc., of the transmission and receiving signals.

The telephone voice data received by the cellular antenna 12 and the cellular communication section 11 is subjected to processing, such as modulation, etc., by the control section 10, and then is sent to a speaker 17. The other receive data is appropriately processed by the control section 10, and then is sent to each section from the control section 10 as necessary.

The speaker 17 is included in the terminal main-unit, and converts the supplied telephone voice data and the voice data of the television program supplied from the AV codec section 15 described below into analog signals. The speaker 17 amplifies the analog voice signals by an internal amplifier, and then converts the voice signals into audible voices to output the voices to the outside. Thus, the speaker 17 outputs the telephone voices and the voices of television programs.

A microphone 18 is included in the terminal main-unit, converts input voice into an analog voice signal, amplifies the signal by an internal amplifier, and furthermore sends the analog voice signal to the control section 10. When the telephone voice signal is supplied from the microphone 18, the control section 10 converts the telephone voice signal into digital voice data, then encodes the data, and furthermore sends the coded telephone voice data to the cellular communication section 11. Thus, the telephone voice data is transmitted from the cellular antenna 12.

A TV antenna 14 is an antenna capable of receiving radio waves of mobile television broadcasting and television broadcasting for the public, and is connected to a TV tuner section 13. The TV tuner section 13 appropriately modulates the signals of the mobile television broadcasting and television broadcasting for the public received by the TV antenna 14, and appropriately performs demodulation, analog/digital conversion, etc. The television broadcasting data demodulated by the TV tuner section 13 is directly sent to an AV codec section 15. Also, when a television program is recorded, the television broadcasting data is sent and saved to a large-capacity recording section 21 including an HDD (Hard Disk Drive) or non-volatile mass memory. In this regard, it goes without saying that the large-capacity recording section 21 is also used for recording various kinds of data in addition to television broadcasting data.

The AV codec section 15 expands and decodes the compression-coded television broadcasting data, and restores audio/video (AV) data of the television program. Among the AV data of the television program, the video data is sent to a display section 19, and the audio data is sent to the speaker 17.

The display section 19 includes a liquid-crystal display, etc., and a display drive circuit for driving the liquid-crystal display. The display drive circuit drives the liquid-crystal display on the basis of various screens, text display data supplied from the control section 10 and the video data of the television program supplied from the AV codec section 15. Thus, the display shows various screens, texts, video of television programs, etc.

An operation section 20 includes operators, such as a numeric pad (keyboard), a power button, a cross-shaped key including an up, down, right, and left keys, start/end conversation keys, etc., and an operation-signal generator for generating operation signals corresponding to the operations of the operators. The user can operate various instructions, such as to make and receive a call, create an email text, send and receive an email, connect to the Internet, receive and watch TV programs, record, reserve recording, and playback the programs, browse Web, operate each application, change applications, etc., by operating the operation section 20.

A memory section 16 includes a ROM (Read Only Memory) and a RAM (Random Access Memory). The ROM stores control program code 22 for an OS (Operating System) and the control section 10 controlling each section, program code 23 according to the present embodiment for the control section 10 executing a screen-hierarchy control function 37 shown in FIG. 3 described below, an application-selection panel control function 31, a screen-display control function 32, a key-input detection function 33, and a focus control function 35, program code 24 for various kinds of applications installed in that terminal, a screen-hierarchy management table managed by the screen-hierarchy control function 37, the other various kinds of initial setting values, font data, dictionary data, various kinds of sound data such as a ring tone, key operation sound, etc., the terminal identification (ID) for the terminal, etc. The ROM includes a rewritable ROM, such as a NAND-type flash memory or EEPROM (Electrically Erasable Programmable Read-Only Memory), and are capable of storing email data, telephone directory and email address directory data, appointment book data, various data related to communication, such as communication history, communication charge, etc., dictionary data, still image and moving image data, sound data such as key operation sound, informing sound, etc., below-described information on master/slave applications set by the user, the other various user set values, etc. The RAM stores any data as a work area when the control section 10 performs various kinds of data processing.

The control section 10 includes a CPU, and performs various control of the terminal, processing, such as watching and recording television programs, etc., the control of applications according to the present embodiment described below, the control of changing applications, etc., on the basis of the various programs, such as the OS and the other program code 22 stored in the memory section 16, the program code 23 described below according to the present embodiment, application program code 24, etc.

In addition, although omitted to be shown in FIG. 1, the cellular-phone terminal according to the present embodiment is provided with each component included in a general cellular-phone terminal, such as a digital camera section, an external memory interface, an external cable connector, an infrared data communication function, an electronic wallet function, a battery, an LED (Light-Emitting Diode) section, a vibrator, etc.

Control Section Function

FIG. 2 illustrates each functional block in the control section 10 when the execution and the control of an application, the control of changing applications, etc., are performed in the control section 10 of the cellular-phone terminal according to the present embodiment.

In FIG. 2, a key-input processing function 33 represents a section for executing the input-operation signal (user-input information) by the user operating various kinds of keys, etc., of the operation section 20 in FIG. 1 described above. The key-input processing function 33 recognizes that various kinds of instructions have been input by the user, for example, instructions for making and receiving a call, creating an email text, sending and receiving an email, connecting to the Internet, browsing Web, watching television programs, operating each application, changing application contents, etc., on the basis of the user-input information from the operation section 20.

Application functions 34 and 36 represent a plurality of applications in an already started state (including both an active state and an inactive state). In the present embodiment, these applications include, for example an email application, a Web browser application, a Web feed application, a telephone program watching application, a waiting screen application, various JAVA applications (JAVA is a registered trademark), etc.

A screen-display control function 32 represents a section for executing a function of controlling displaying an image onto the display screen of the display section 19 in FIG. 1 described above. In the present embodiment, the screen-display control function 32 controls displaying each content image, such as an application-selection panel image described below, a waiting image, each application image, etc., onto the display screen.

An application-selection-panel control function 31 represents a section for executing a function of controlling the operation of the application-selection panel displayed on the display screen of the display section 19 through the above-described screen-display control function 32. In this regard, the application-selection panel is a panel on which software keys, etc., are disposed when the user selects the content displayed on the display screen of the display section 19 in FIG. 1. That is to say, the user can specify the content to be displayed on the display screen by operating the application-selection panel. The details of the application-selection panel will be described later.

A focus control function 35 represents a section for executing a function of controlling which of the application displaying the content on the display screen of the display section 19 through the above-described screen-display control function 32 is focused (is activated). In this regard, to be focused means that the application goes into a state of allowing to accept a request from the user, such as key input.

A screen-hierarchy control function 37 represents a section for executing a function of managing and controlling a screen-hierarchical relationship among individual applications when the content of each application in an already started state is displayed on the display screen of the display section 19 through the screen-display control function 32. In this regard, in the present embodiment, the screen-hierarchical relationship of the above-described each application when the content of the above-described each application is displayed on the display screen is represented in a Z-axis direction.

Application-Image Master/Slave Mechanism

In the present embodiment, the above-described screen-hierarchy control function 37 has a function of managing and controlling one of at least two applications specified by the user or determined in advance as a master and the other of the applications as a slave among a plurality of already started applications. In this regard, in the present embodiment, a master is referred to as an application which is located immediately before (one level above in a vertical relationship in Z-axis direction) all the time in a screen hierarchy. On the other hand, a slave is referred to as an application which is located immediately below (one level below in a vertical relationship in Z-axis direction) all the time in the screen hierarchy. The master and the slave are put in a state of being linked to each other.

Example of Screen Transition in First Embodiment

In the following, with reference to FIGS. 3 to 6, as a first embodiment of the present invention, a description will be given of an example of screen transition and an example of hierarchy transition when the screen-display control function 32 displays each content onto the display screen while the above-described screen-hierarchy control function 37 manages and controls a screen-hierarchical relationship between the above-described master/slave applications and the other applications.

FIG. 3 shows an example of the display screen transition of the display section 19. FIG. 4 shows an example of hierarchy transition of each application in the example of the screen transition in FIG. 3 in three dimensions. In this regard, (a) in FIG. 4 indicates a hierarchy example of each application at the time of the screen example of (a) in FIG. 3, (b) in FIG. 4 indicates a hierarchy example of each application at the time of the screen example of (b) in FIG. 3, and (c) in FIG. 4 indicates a hierarchy example of each application at the time of the screen example of (c) in FIG. 3.

In FIGS. 3 and 4, an example is taken of the case where for the applications in which the master/slave relationship is set, the application for the application-selection panel 41 is set to a master M, and the application for a background 40 of the waiting screen including a wallpaper set by the ordinary user is set to a slave S. Also, in FIGS. 3 and 4, an example is taken of a Web browser application and a Web feed application as applications in addition to the master M and the slave S. The dotted lines in the figure indicate the screen transition and the hierarchy transition among different applications. In this regard, in FIGS. 3 and 4, a page of "a list of television programs" on the Internet is taken as an example of the content 42 of the Web browser application, and a page of "a list of news" is taken as an example of the content 43 of the Web feed application. However, these are examples, and the present invention is not limited to a specific application.

In FIGS. 3 and 4, the window of the application for the application-selection panel 41 has, for example a size of displaying only the lower portion of the display area of the display screen. Also, the window of the application for a background 40 has a size of displaying the display area of the full display screen. The application of the application-selection panel 41 is located at the front level of the application for a background 40 in the screen hierarchy as a master M all the time. The application for a background 40 is located immediately below the application of the application-selection panel 41 in the screen hierarchy as a slave S.

On the other hand, the window for the Web browser application of the content 42 has a size of displaying only the upper portion of the display area excluding the window of the application-selection panel 41 out of the display screen of the display section 19. In the same manner, the window for the Web feed application of the content 43 has a size of displaying only the upper portion of the display area excluding the window of the application-selection panel 41 out of the display screen.

When the user inputs an operation of changing contents through a software key, etc., displayed in the application-selection panel 41, the screen-hierarchy control function 37 changes an upper/lower-screen hierarchical relationship among the background application, the Web browser application, and the Web feed application in accordance with the user operation. That is to say, the screen-hierarchy control function 37 changes a screen-hierarchical relationship of the applications in accordance with the input operation of changing contents from the user. Thus, for example, in FIGS. 3 and 4, the screen and hierarchy transitions are carried out between the state of (a) and the state of (b), between the state of (b) and the state of (c), and between the state of (a) and the state of (c).

A more specific description will be given. In the state of (a) in FIGS. 3 and 4, the application of the background 40 is disposed immediately below the application of the application-selection panel 41. The content 42, the Web browser application, and the content 43, the Web feed application, are disposed at the level lower than that. In this regard, a hierarchical relationship between the Web browser application and the Web feed application depends on which application has been used before.

For example, in a state indicated by (a) in FIGS. 3 and 4 in which the background 40 is displayed, when the user inputs an instruction to change contents for displaying "a list of television programs" by operating the software key, etc., in the application-selection panel 41, the screen-hierarchy control function 37 disposes the Web browser application for displaying the content 42 of "a list of television programs" at higher level of the application of the background 40. Thus, the content 42 of "a list of television programs" shown by (b) in FIGS. 3 and 4 are displayed on the display screen. At this point in time, the applications whose contents are displayed on the display screen become the application of the application-selection panel 41 and the Web browser application displaying the content of the above-described "a list of television programs".

Also, for example in a state shown by (a) in FIGS. 3 and 4 displaying the background 40, when the user inputs an instruction to change contents for displaying "a list of news" by operating the software key, etc., in the application-selection panel 41, the screen-hierarchy control function 37 disposes the Web feed application for displaying the content 43 of "a list of news" at a higher level of the application of the background 40. Thus, the content of "a list of news" as shown by (c) in FIGS. 3 and 4 is displayed on the display screen. In this regard, at this point in time, the applications whose contents are displayed on the display screen become the application of the application-selection panel 41 and the Web feed application displaying the content of the above-described "a list of news".

Also, for example in a state shown by (b) in FIGS. 3 and 4 displaying the content 42, when the user inputs an instruction to change contents for displaying "a list of news" by operating the software key, etc., in the application-selection panel 41, the screen-hierarchy control function 37 moves the Web browser application of the content 42 to the lower level of the application of the background 40, and disposes the Web feed application of the content 43 at the higher level of the application of the background 40. Alternatively, the screen-hierarchy control function 37 disposes the Web feed application of the content 43 at a higher level of the Web browser application of the content 42. Thus, the content of "a list of news" as shown by (c) in FIGS. 3 and 4 is displayed on the display screen. At this point in time, the applications whose contents are displayed on the display screen become the application of the application-selection panel 41 and the Web feed application displaying the content of the above-described "a list of news".

Also, for example in a state shown by (c) in FIGS. 3 and 4 displaying the content 43, when the user inputs a instruction to change contents for displaying "a list of television programs" by operating the software key, etc., in the application-selection panel 41, the screen-hierarchy control function 37 moves the Web feed application of the content 43 to the lower level of the application of the background 40, and disposes the Web browser application of the content 42 at the higher level of the application of the background 40. Alternatively, the screen-hierarchy control function 37 disposes the Web browser application of the content 42 at a higher level of the Web feed application of the content 43. Thus, the content of "a list of television programs" as shown by (b) in FIGS. 3 and 4 is displayed on the display screen. At this point in time, the applications whose contents are displayed on the display screen become the application of the application-selection panel 41 and the Web browser application displaying "a list of television programs".

Also, for example in a state shown by (b) in FIGS. 3 and 4 displaying the content 42, when the user inputs an instruction to change contents for displaying the background 40 by operating the software key, etc., in the application-selection panel 41, the screen-hierarchy control function 37 disposes the application the background 40 at a higher level of the Web browser application of the content 42. Thus, the waiting screen of the background 40 as shown by (a) in FIG. 3 is displayed on the display screen. At this point in time, the applications whose contents are displayed on the display screen become the application of the application-selection panel 41 and the application of the background 40.

Also, for example in a state shown by (c) in FIGS. 3 and 4 displaying the content 43, when the user inputs an instruction to change contents for displaying the background 40 by operating the software key, etc., in the application-selection panel 41, the screen-hierarchy control function 37 disposes the application the background 40 at a higher level of the Web feed application of the content 43. Thus, the waiting screen of the background 40 as shown by (a) in FIGS. 3 and 4 is displayed on the display screen. At this point in time, the applications whose content is displayed on the display screen become the application of the application-selection panel 41 and the application of the background 40.

As described above, by the first embodiment of the present invention, when the user inputs an instruction of changing contents through the operation of the application-selection panel, the screen-hierarchy control function 37 controls to change a hierarchical relationship between the other applications while keeping a hierarchical relationship between the application-selection panel 41, which is a master M, and the background 40, which is a slave S. Also, in the present embodiment, the content in accordance with the user operation is displayed in the upper display area excluding the application-selection panel 41 in the display screen. That is to say, the application-selection panel and the content of the application selected by the user are displayed on the display screen. Accordingly, it becomes possible for the user to browse the content displayed by the change at the front of the display screen. In this manner, in the case of the present embodiment, the user changes the contents of two different categories displayed on the screen by operating the application-selection panel. However, in reality, two different applications are changed. That is to say, it is sufficient for the user only to be aware that the contents of two different categories are changed. It is implemented to change applications seamlessly without the user being aware of changing applications in particular.

Figure 6:
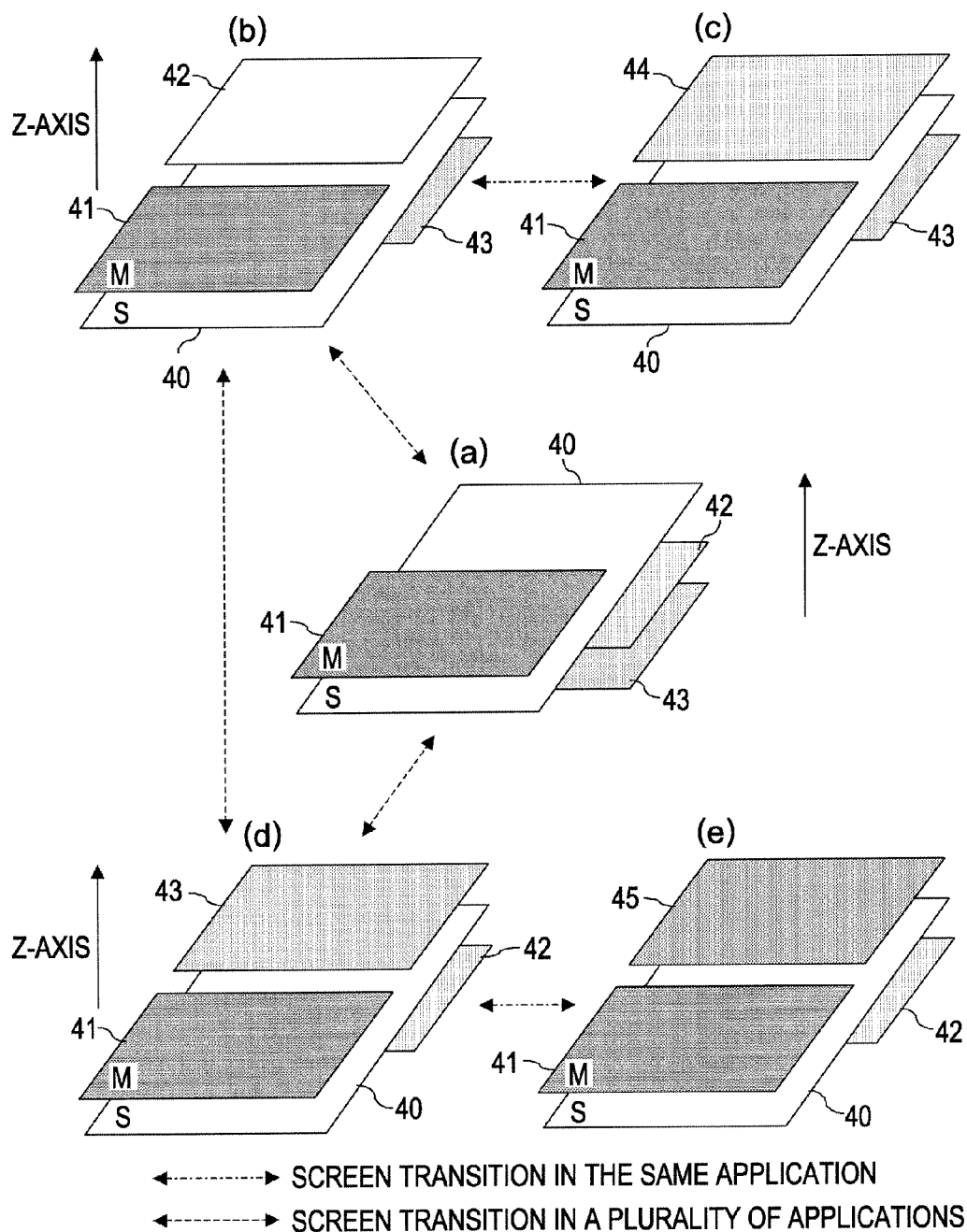
FIG. 6 is a three-dimensional diagram illustrating an example of the hierarchical transitions of each application in the example of screen transitions in FIG. 5.

In the above-described FIGS. 3 and 4, an example is taken of the case of screen transition and hierarchy transition in response to the change of different applications. However, as shown in FIGS. 5 and 6, the present invention can be applied to the case of making a screen transition in the same application in addition to screen transition and hierarchy transition in different applications.

FIG. 5 shows an example of the display screen transition of the display section 19. FIG. 6 shows an example of hierarchy transition of each application in the example of the screen transition in FIG. 5 in three dimensions. In this regard, (a) in FIG. 6 indicates a hierarchy example of each application at the time of the screen example of (a) in FIG. 5. In the following, in the same manner, (b) in FIG. 6 indicates a hierarchy example of each application at the time of the screen example of (b) in FIG. 5, (c) in FIG. 6 indicates a hierarchy example of each application at the time of the screen example of (c) in FIG. 5, (d) in FIG. 6 indicates a hierarchy example of each application at the time of the screen example of (d) in FIG. 5, and (e) in FIG. 6 indicates a hierarchy example of each application at the time of the screen example of (e) in FIG. 5.

In the same manner as FIGS. 3 and 4 described above, in FIGS. 5 and 6, an example is taken of the case where for the applications in which the master/slave relationship is set, the application of the application-selection panel 41 is set to a master M, and for example, the application of the background 40 for waiting screen is set to a slave S. Also, in FIGS. 3 and 4, an example is taken of a Web browser application and a Web feed application as an application in addition to the master M and the slave S. The dotted lines in the figure indicate the screen transition and the hierarchy transition among different applications. The dash-single-dot lines in the figure indicate the screen transition and the hierarchy transition in the same application. In this regard, in FIGS. 5 and 6, a page of "a list of television programs" on the Internet is taken as the content 42 of the Web browser application, and an example is taken of the page linked to the "1ch. A broadcasting" menu in the above-described "a list of television programs" page as the content 44. Also, a page of "a list of news" is taken as an example of the content 43 of the Web feed application, and an example is taken of the page linked to the "today's weather" menu in the above-described "a list of news" page as an example of the content 45. However, these are examples, and the present invention is not limited to a specific application.

In the same manner as FIGS. 3 and 4 described above, in FIGS. 5 and 6, the window of the application for the application-selection panel 41 has, for example a size of displaying only the lower portion of the display area of the display screen. Also, the window of the application for a background 40 has a size of displaying the display area of the full display screen. The application of the application-selection panel 41 is set to a master M. The application for a background 40 is set to a slave S. Also, in the same manner as the example in FIGS. 3 and 4, the window for the web browser application and the Web feed application has a size of displaying only the upper portion of the display area excluding the window of the application-selection panel 41.

In the same manner as FIGS. 3 and 4 described above, in FIGS. 5 and 6, when the user inputs an operation of changing contents through a software key, etc., displayed in the application-selection panel 41, the screen-hierarchy control function 37 changes an upper/lower-screen hierarchical relationship among the background application, the Web browser application, and the Web feed application in accordance with the user operation. However, in FIGS. 5 and 6, when the user operates to change the contents in the same application, the screen-hierarchy control function 37 does not change an upper/lower-screen hierarchical relationship among the applications. That is to say, as shown, for example in FIGS. 5 and 6, the screen-hierarchy control function 37 changes a hierarchical relationship of the applications when changing the contents between different applications, such as the screen and hierarchy transitions between the state of (a) and the state of (b), between the state of (b) and the state of (d), and between the state of (a) and the state of (d). However, the screen-hierarchy control function 37 does not change the upper/lower-screen hierarchical relationship of the applications when changing the contents in the same application, for example, such as the screen transition between the state of (b) and the state of (c), and between the state of (d) and the state of (e).

A more specific description will be given. In the state of (a) in FIGS. 5 and 6, the application of the background 40 is disposed immediately below the application of the application-selection panel 41. The content 42, the Web browser application, and the content 43, the Web feed application, are disposed at the level lower than that. In this regard, a hierarchical relationship between the Web browser application and the Web feed application depends on which application has been used before.

For example, in a state indicated by (a) in FIGS. 5 and 6 in which the background 40 is displayed, when the user inputs an instruction to change contents for displaying "a list of television programs" by operating the software key, etc., in the application-selection panel 41, the screen-hierarchy control function 37 disposes the Web application browser for displaying the content 42 of "a list of television programs" at the highest level of the application of the background 40. Thus, the content 42 of "a list of television programs" shown by (b) in FIGS. 5 and 6 is displayed on the display screen. At this point in time, the applications whose contents are displayed on the display screen become the application of the application-selection panel 41 and the Web browser application displaying the content 42 of the above-described "a list of television programs".

Also, for example in a state shown by (a) in FIGS. 5 and 6 displaying the background 40, when the user inputs a instruction to change content displaying "a list of news" by operating the software key, etc., in the application-selection panel 41, the screen-hierarchy control function 37 disposes the Web feed application for displaying the content 43 of "a list of news" at a higher level of the application of the background 40. Thus, the content of "a list of news" as shown by (d) in FIGS. 5 and 6 is displayed on the display screen. In this regard, at this point in time, the applications whose contents are displayed on the display screen become the application of the application-selection panel 41 and the Web feed application displaying the content 43 of the above-described "a list of news".

Also, for example in a state shown by (b) in FIGS. 5 and 6 displaying the content 42, when the user inputs a instruction to change content displaying "a list of news" by operating the software key, etc., in the application-selection panel 41, the screen-hierarchy control function 37 moves the Web browser application of the content 42 to the lower level of the application of the background 40, and disposes the Web feed application of the content 43 at the higher level of the application of the background 40. Alternatively, the screen-hierarchy control function 37 disposes the Web feed application of the content 43 at a higher level of the Web browser application of the content 42. Thus, the content 43 of "a list of news" as shown by (d) in FIGS. 5 and 6 is displayed on the display screen. At this point in time, the applications whose content is displayed on the display screen become the application of the application-selection panel 41 and the Web feed application displaying the content 43 of the above-described "a list of news".

Also, for example in a state shown by (d) in FIGS. 5 and 6 displaying the content 43, when the user inputs a instruction to change content displaying "a list of television programs" by operating the software key, etc., in the application-selection panel 41, the screen-hierarchy control function 37 moves the Web feed application of the content 43 to the lower level of the application of the background 40, and disposes the Web browser application of the content 42 at the higher level of the application of the background 40. Alternatively, the screen-hierarchy control function 37 disposes the Web browser application of the content 42 at a higher level of the Web feed application of the content 43. Thus, the content 42 of "a list of television programs" as shown by (b) in FIGS. 5 and 6 is displayed on the display screen. At this point in time, the applications whose contents are displayed on the display screen become the application of the application-selection panel 41 and the Web browser application displaying the content 42 of "a list of television programs".

Also, for example in a state shown by (b) in FIGS. 5 and 6 displaying the content 42, when the user selects, for example "1ch. A broadcasting" out of the above-described "a list of television programs" by operating the software key, etc., in the application-selection panel 41, the Web browser application displays the content 44 of the "A broadcasting program list" page as shown by (c) in FIGS. 5 and 6. The "a list of television programs" of (b) in FIGS. 5 and 6 and the "A broadcasting program list" of (c) in FIGS. 5 and 6 are both the contents handled by the same Web browser application.

Also, for example in a state shown by (d) in FIGS. 5 and 6 displaying the content 43, when the user selects, for example "3. today's weather" menu out of the above-described "a list of news" by operating the software key, etc., in the application-selection panel 41, the Web feed application displays the content 45 of the "today's weather" page linked from that menu as shown by (e) in FIGS. 5 and 6. The "a list of news" of (d) in FIGS. 5 and 6 and the "today's weather" of (e) in FIGS. 5 and 6 are both the contents handled by the same Web feed application.

Also, for example in a state shown by (b) in FIGS. 5 and 6 displaying the content 42, when the user inputs a instruction to change content displaying the background 40 by operating the software key, etc., in the application-selection panel 41, the screen-hierarchy control function 37 disposes the application the background 40 at a higher level of the Web browser application of the content 42. Thus, the waiting screen of the background 40 as shown by (a) in FIGS. 5 and 6 is displayed on the display screen. At this point in time, the applications whose contents are displayed on the display screen become the application of the application-selection panel 41 and the application of the background 40. In this regard, it is also possible to return to the waiting screen of the background 40 as shown by (a) in FIGS. 5 and 6 from the state shown by (c) in FIGS. 5 and 6 in which the content 44 is displayed.

Also, for example in a state shown by (d) in FIGS. 5 and 6 displaying the content 43, when the user inputs a instruction to change content displaying the background 40 by operating the software key, etc., in the application-selection panel 41, the screen-hierarchy control function 37 disposes the application the background 40 at a higher level of the Web feed application of the content 43. Thus, the waiting screen of the background 40 as shown by (a) in FIGS. 5 and 6 is displayed on the display screen. At this point in time, the applications whose contents are displayed on the display screen become the application of the application-selection panel 41 and the application of the background 40. In this regard, it is also possible to return to the waiting screen of the background 40 as shown by (a) in FIGS. 5 and 6 from the state shown by (e) in FIGS. 5 and 6 in which the content 45 is displayed.

As described above, by the first embodiment of the present invention, when the user inputs an instruction of changing contents through the operation of the application-selection panel, it is possible for the screen-hierarchy control function 37 to control to change a hierarchical relationship between the other applications and to change contents in the same application while keeping a hierarchical relationship between the application-selection panel 41, which is a master M, and the background 40, which is a slave S. That is to say, it is sufficient for the user only to be aware that the contents of two different categories are changed. It is implemented to change different applications and to change the contents in the same application seamlessly without the user being aware of changing applications in particular.

Screen-Hierarchy Control Flow in First Embodiment

A description will be given of the processing flow of when the control section 10 of the cellular-phone terminal according to an embodiment of the present invention manages and controls a hierarchical relationship of the master/slave applications and the other applications by each function shown in FIG. 2 described above using FIGS. 7 to 9.

Figure 7:
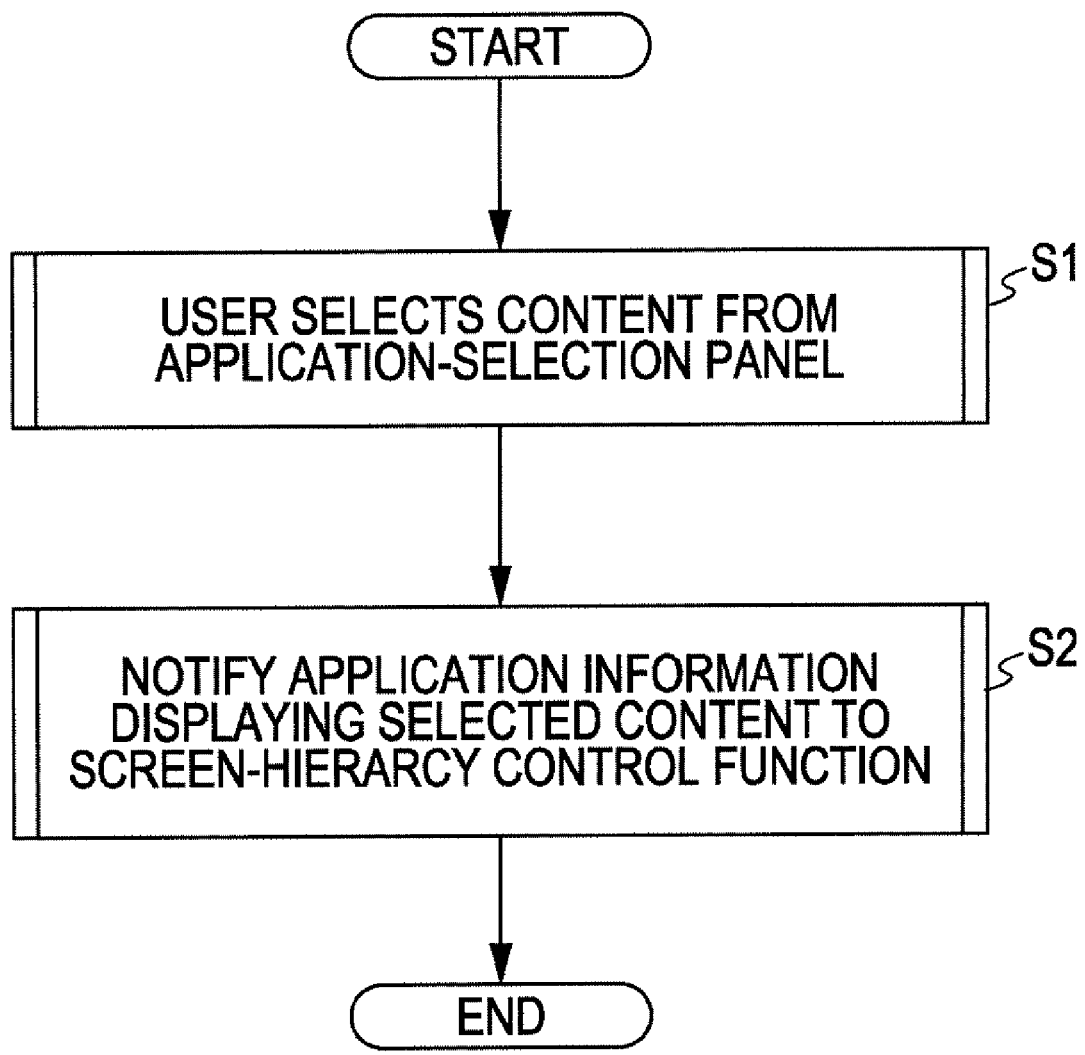
FIG. 7 is a processing flowchart of each corresponding function in the control section when a user selects a desired content from an application-selection panel.

FIG. 7 shows the processing flowchart of each corresponding function in the control section 10 when the user selects a desired content from the application-selection panel 41.

In FIG. 7, first, in step S1, the application-selection panel control function 31 of the control section 10 displays the above-described application-selection panel 41 onto the display screen of the display section 19 through the screen-display control function 32. At this time, software keys (that is to say, content choices), etc., are disposed on the application-selection panel 41 in order to select a desired content from a plurality of contents, such as a list of the television programs and a list of news, for example. When the key-input detection function 33 detects that the user has selected any one of the content choices from a plurality of content choices in the application-selection panel 41 in a state in which the application-selection panel 41 is focused by the focus control function 35, the processing of the control section 10 proceeds to step S2.

In step S2, the application-selection panel control function 31 of the control section 10 notifies the application information (for example, the application ID) for displaying the content selected by the user onto the display screen to the screen-hierarchy control function 37.

Figure 8:
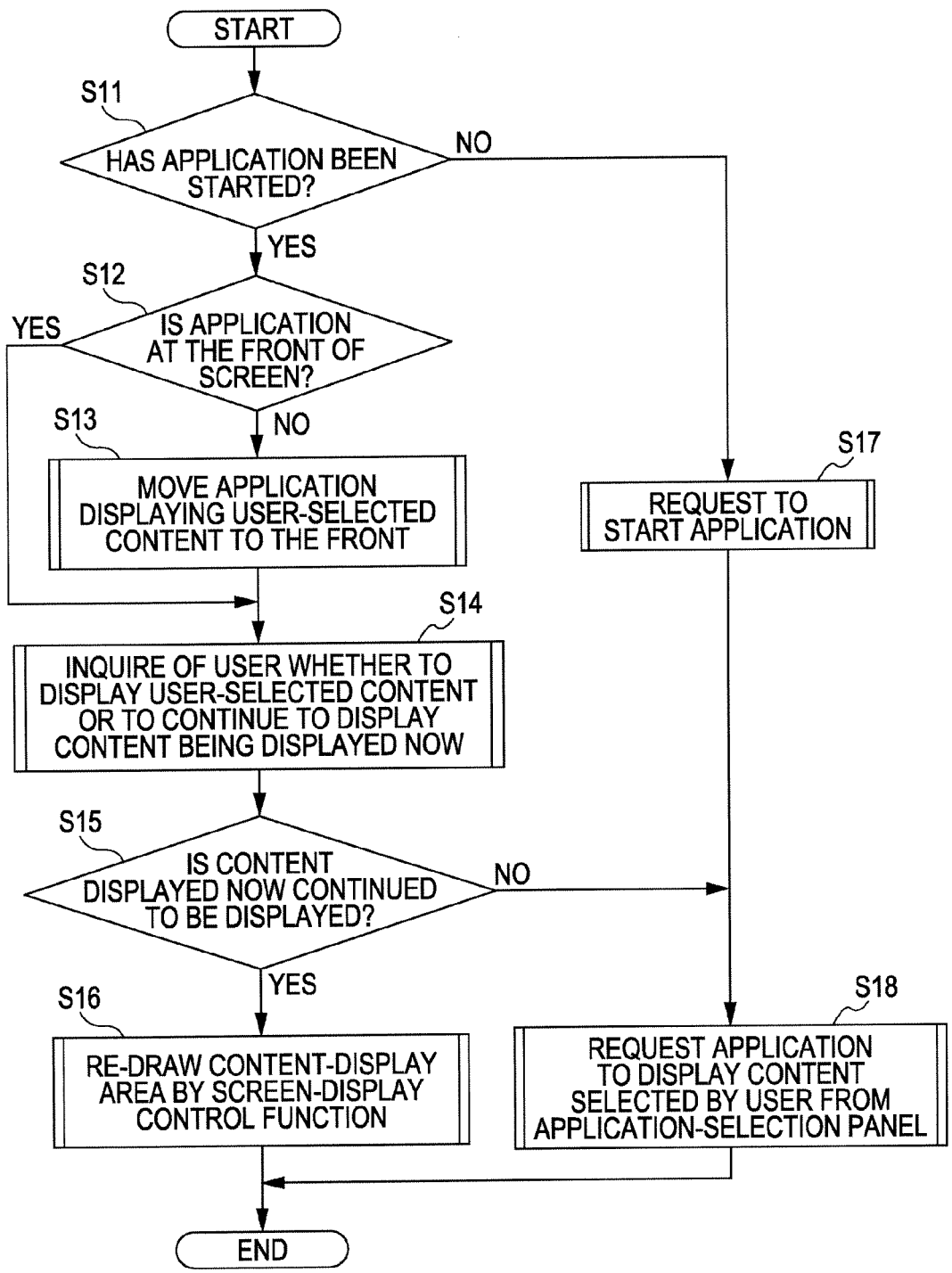
FIG. 8 is a processing flowchart of a screen-hierarchy control function after receiving the above-described application program in step S2 in FIG. 7.

Next, FIG. 8 shows the processing flowchart of the screen-hierarchy control function 37 after receiving the application program in step S2 in FIG. 7 described above.

In FIG. 8, when the screen-hierarchy control function 37 receives the application information (the application ID), the screen-hierarchy control function 37 checks whether the application corresponding to that application information has been already started in step S11. If the screen-hierarchy control function 37 determines that the application has already been started, the processing proceeds to step S12. On the other hand, if the screen-hierarchy control function 37 determines that the application has not been started, the processing proceeds to step S17.

When it is determined that the application corresponding to that application information has been already started and the processing has proceeded to step S12, the screen-hierarchy control function 37 determines whether that application is the same application whose content is displayed at the highest level (that is to say, at the front of the screen). If the screen-hierarchy control function 37 determines that those applications are the same, the processing proceeds to step S14. On the other hand, if the screen-hierarchy control function 37 determines that those applications are different, the processing proceeds to step S13.

In step S12, when it is determined that both applications are different and the processing has proceeded to step S13, the screen-hierarchy control function 37 moves the application corresponding to the application information to the highest level (that is to say, at the front of the screen) of the current screen hierarchy, and then the processing proceeds to step S14.

When the processing proceeds to step S14, since the application that has moved to the front of the screen might already be displaying some content, the screen-hierarchy control function 37 inquires of the user whether to display the content selected by the user from the application-selection panel 41, or to display the content currently being displayed without change. In this regard, the inquiry is made by displaying a predetermined checking message, etc., onto the display screen through the screen-display control function 32.

Next, when the processing proceeds to step S15, the screen-hierarchy control function 37 determines whether the user wants to continue displaying the content currently being displayed without change. If the user wants to continue displaying the content currently being displayed without change through the key-input processing function 33, the screen-hierarchy control function 37 causes the processing to proceed to step S16. If not, the processing proceeds to step S18.

When the processing proceeds to step S16, the screen-hierarchy control function 37 causes the screen-display control function 32 to redraw the content image displayed in the display area where that content is displayed.

On the other hand, when the processing proceeds to step S18, the screen-hierarchy control function 37 requests the application corresponding to the application information to display the content selected by the user.

Also, in step S11, when it is determined that the application corresponding to the application information has not been started and the processing proceeds to step S17, the screen-hierarchy control function 37 request the application indicated by the application information to start. After the application is started, the processing proceeds to step S18, and the screen-hierarchy control function 37 requests that application to display the content selected by the user.

Figure 9:
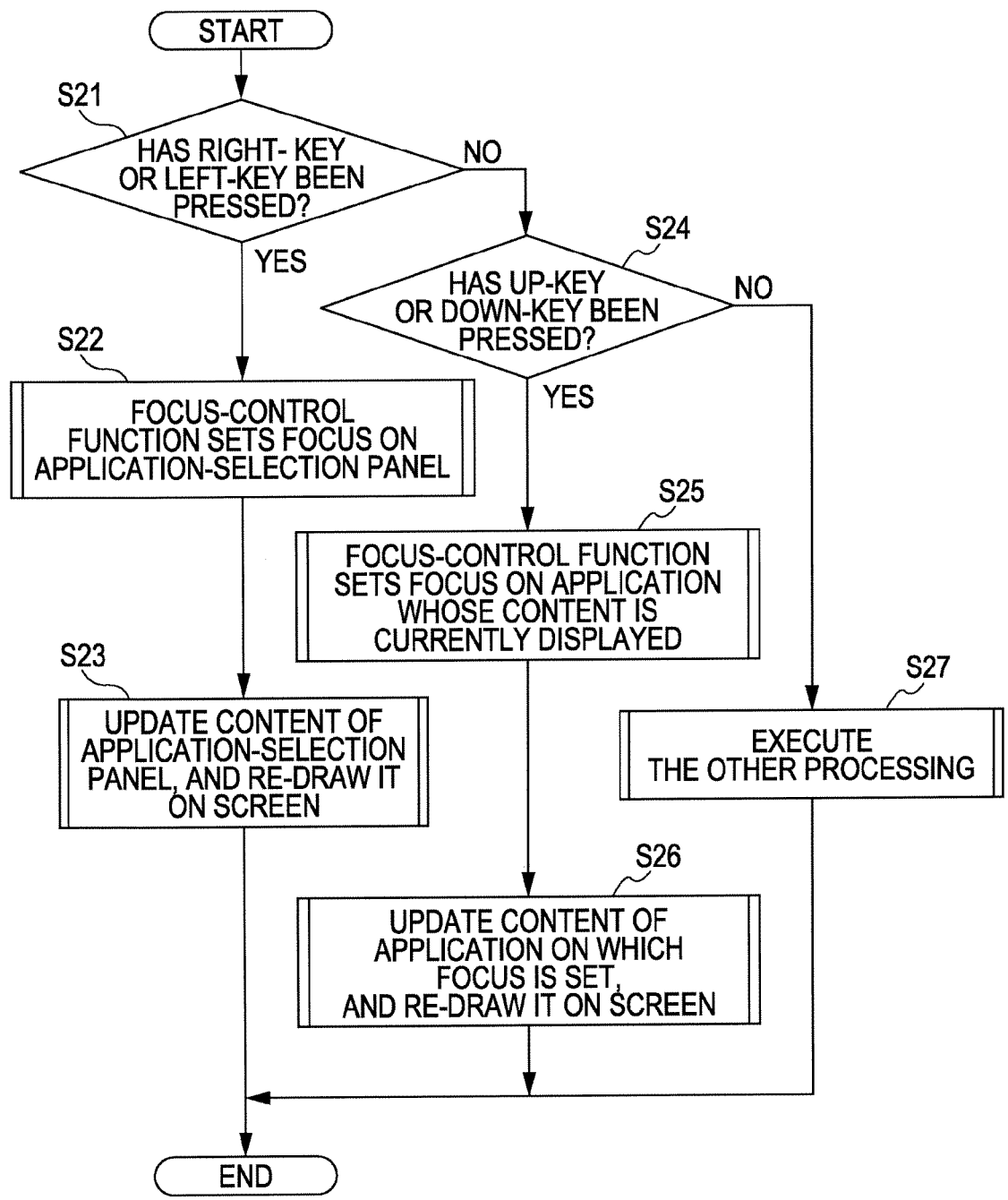
FIG. 9 is a processing flowchart of a key-input processing function, an application-operation-panel control function, and a focus-control function when the user operates an application operation panel.

Next, FIG. 9 illustrates a processing flowchart of a relationship among the key-input processing function 33, the application-operation-panel control function 31, and the focus-control function 35 when the user operates the application operation panel 41.

In this regard, in the flowchart of FIG. 9, an example is illustrated of the case where the operations of the application operation panel 41, the contents 42 to 45 of the Web browser application, the Web feed application, etc., are performed on the basis of the user operation through the operation section 20 of the cellular-phone terminal. For example, when the right/left key of the cross-shaped key is pressed, the application operation panel 41 is focused. When the up/down key of the cross-shaped key is pressed, the contents 42 to 45 of the Web browser application, the Web feed application, etc., are focused.

In FIG. 9, the key-input detection function 33 of the control section 10 is in a state of waiting key input from the operation section 20. When the user pressed any one of the keys of the operation section 20, the key-input detection function 33 detects what key is pressed, and informs the focus control function 35 of the key-pressed detection information.

The focus control function 35 of the control section 10 determines whether the key pressed by the user is the right/left key of the cross-shaped key in step S21. If it is determined that the right/left key has been pressed, the processing proceeds to step S22. If it is determined that the other key has been pressed, the processing proceeds to step S24.

If it is determined that the right/left key has been pressed and the processing proceeds to step S22, the focus control function 35 sets focus on the application operation panel 41. The processing of the control section 10 proceeds to step S23.

When the processing proceeds to step S23, the application-selection panel control function 31 of the control section 10 updates the content of the application operation panel 41, and redraws it on the display screen.

Also, in step S21, when it is determined that the key other than the right/left key has been pressed and the processing proceeds to step S24, the focus control function 35 determines whether the user has pressed the up/down key. If it is determined that the up/down key has been pressed, the processing proceeds to step S25. If it is determined that the other key has been pressed, the processing proceeds to step S27.

If it is determined that the up/down key has been pressed and the processing proceeds to step S24, the focus control function 35 sets focus on the contents 42 to 45 of the Web browser application, the Web feed application, etc. The processing of the control section 10 proceeds to step S26.

When the processing proceeds to step S26, among the application functions 34 and 36 which are in an already started state by the control section 10, the application function whose content is displayed at the highest level (that is to say, at the front of the screen) in the current screen hierarchy updates the content of that application, and redraws it on the display screen.

Also, in step S24, when it is determined that the key other than the up/down key (that is to say, none of the up/down and right/left keys of the cross-shaped key) has been pressed and the processing proceeds to step S27, the control section 10 performs the other processing corresponding to that pressed key.

In this regard, a relationship between the kinds of key and the corresponding processing, and the determination procedure, which has been described in the example in FIG. 9, are only one example. For example, it is possible to assign the same key to the application-selection panel and each application, and to assign another independent key to the focus movement.

Example of Screen Transition in Second Embodiment

In the following, with reference to FIGS. 10 to 17, a description will be given of an example of screen transition and an example of hierarchy transition when the contents are displayed on the display screen while the screen-hierarchy control function 37 manages and controls a hierarchy relationship between the master/slave applications and the other application as a second embodiment of the present invention.

Figure 10:
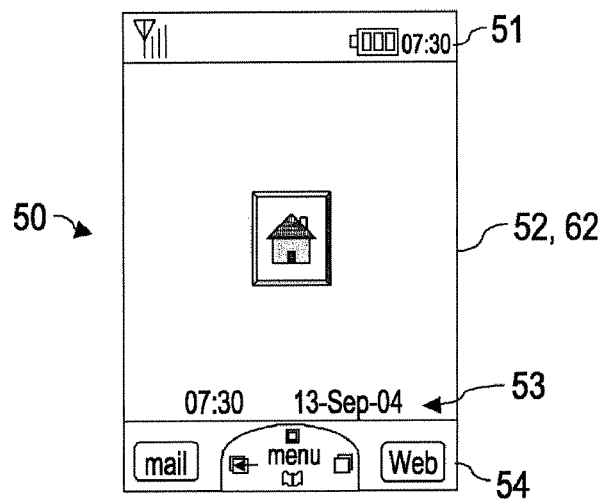
FIG. 10 is a diagram illustrating an example of a display screen by an application having a master-slave relationship in a second embodiment.
Figure 11:
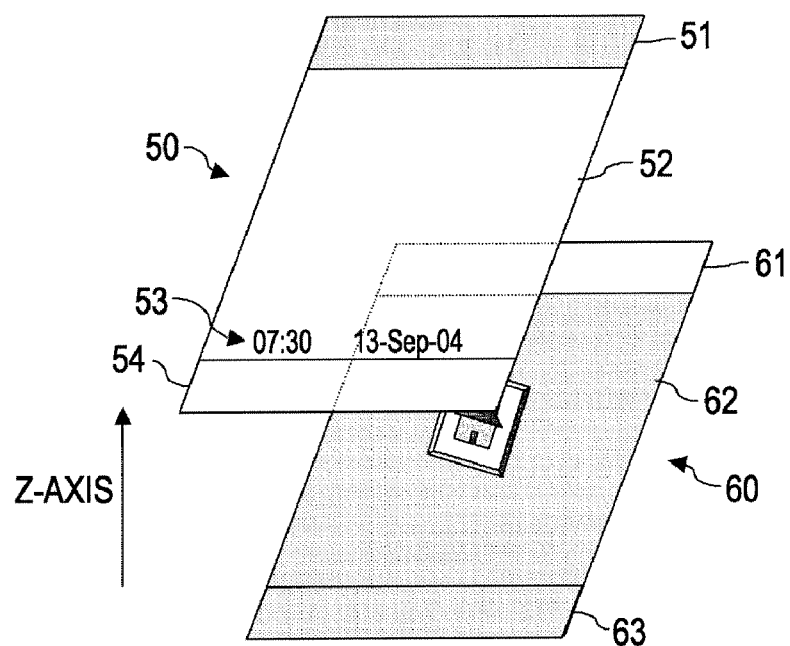
FIG. 11 is a three-dimensional diagram illustrating a hierarchy state of each application in the example screen in FIG. 10.
Figure 12:
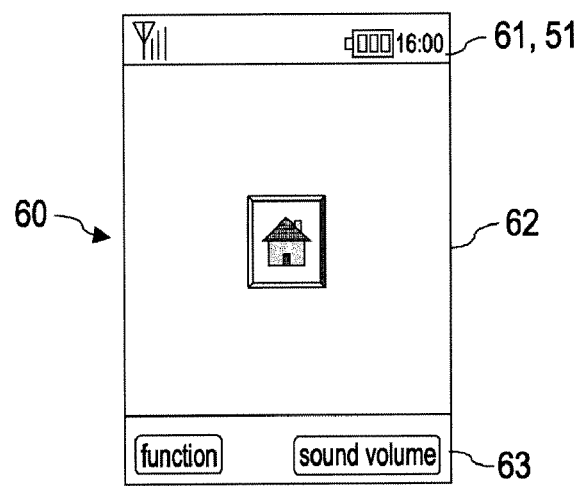
FIG. 12 is a diagram illustrating an example of a display screen by each application when the slave application is set at the highest level of the screen hierarchy in the second embodiment.
Figure 13:
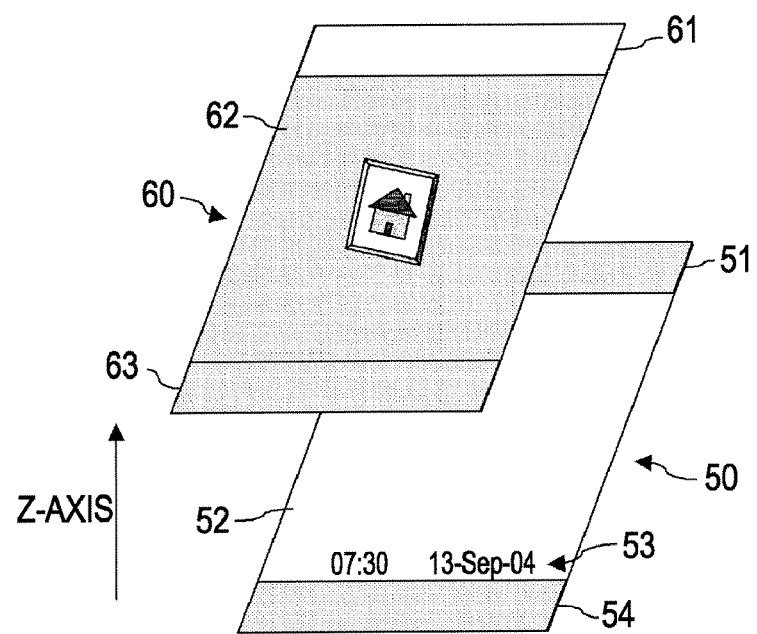
FIG. 13 is a three-dimensional diagram illustrating a hierarchy state of each application in the example screen in FIG. 12.

First, FIGS. 10 to 13 illustrates an example of the master/slave applications in the second embodiment of the present invention. In this regard, FIG. 10 illustrates an example of the display screen of the display section 19. FIG. 11 illustrates a hierarchy state of each application in the example screen of FIG. 10 in three dimensions. In the same manner, FIG. 12 illustrates an example of the display screen, and FIG. 13 illustrates a hierarchy state of each application in the example screen of FIG. 12 in three dimensions.

In FIGS. 10 to 13, an example is taken of the case where for the applications in which the master/slave relationship is set, the application of the waiting screen 50 is set to a master, and for example, a JAVA application is set to a slave. In this regard, in the example of FIGS. 10 to 13, the waiting screen 50 includes, for example a receiving-state and battery-remaining amount area 51, a transparent background area 52, a date-and-time information area 53, and an application-selection panel area 54. Also, the JAVA application contents 60 includes a transparent area 61, a main-content area 62, and a function-selection panel area 63.

Here, in the second embodiment of the present invention, in the same manner as the above-described first embodiment, a master is referred to as an application which is located immediately before (one level above) all the time in a screen hierarchy, and a slave is referred to as an application which is located immediately below (one level below) all the time in a screen hierarchy. The master and the slave are put in a state of being linked to each other. However, in the case of the second embodiment of the present invention, when the user selects the content of the slave application, the above-described master/slave relationship is temporarily released, and the slave application is capable of being moved to the highest level (that is to say, at the front of the screen) in the screen hierarchy.

That is to say, in the second embodiment of the present invention, when the JAVA application is standby inactive, as shown in FIGS. 10 and 11, the screen-hierarchy control function 37 of the control section 10 disposes the application of the waiting screen 50, which is a master, at the highest level (at the front of the screen) in the screen hierarchy, and disposes the contents 60 of the JAVA applications at the immediate below. In this regard, at this time, the display screen of the display section 19 displays the waiting screen 50. However, the background area 52 of the waiting screen 50 is a transparent area as described above, and thus the background area 52 displays the content of the main-content area 62 of the JAVA application that exists immediate below thereof.

On the other hand, when the user has selected the content 60 of the JAVA application, the screen-hierarchy control function 37 temporarily releases the above-described master/slave relationship, and moves the content 60 of the JAVA application, which is JAVA standby active, to the highest level (at the front of the screen) in the screen hierarchy. Thus, as shown in FIGS. 12 and 13, the display screen of the display section 19 displays the JAVA application content 60, etc. However, the transparent area 61 of the JAVA application content 60 displays the receiving state of the waiting screen 50 and the battery remaining amount area 51 that exists immediate below.

Next, with reference to FIGS. 14 to 17, a description will be given of a screen-hierarchy relationship and an example of hierarchy transition of master/slave applications and a plurality of the other applications.

Figure 14:
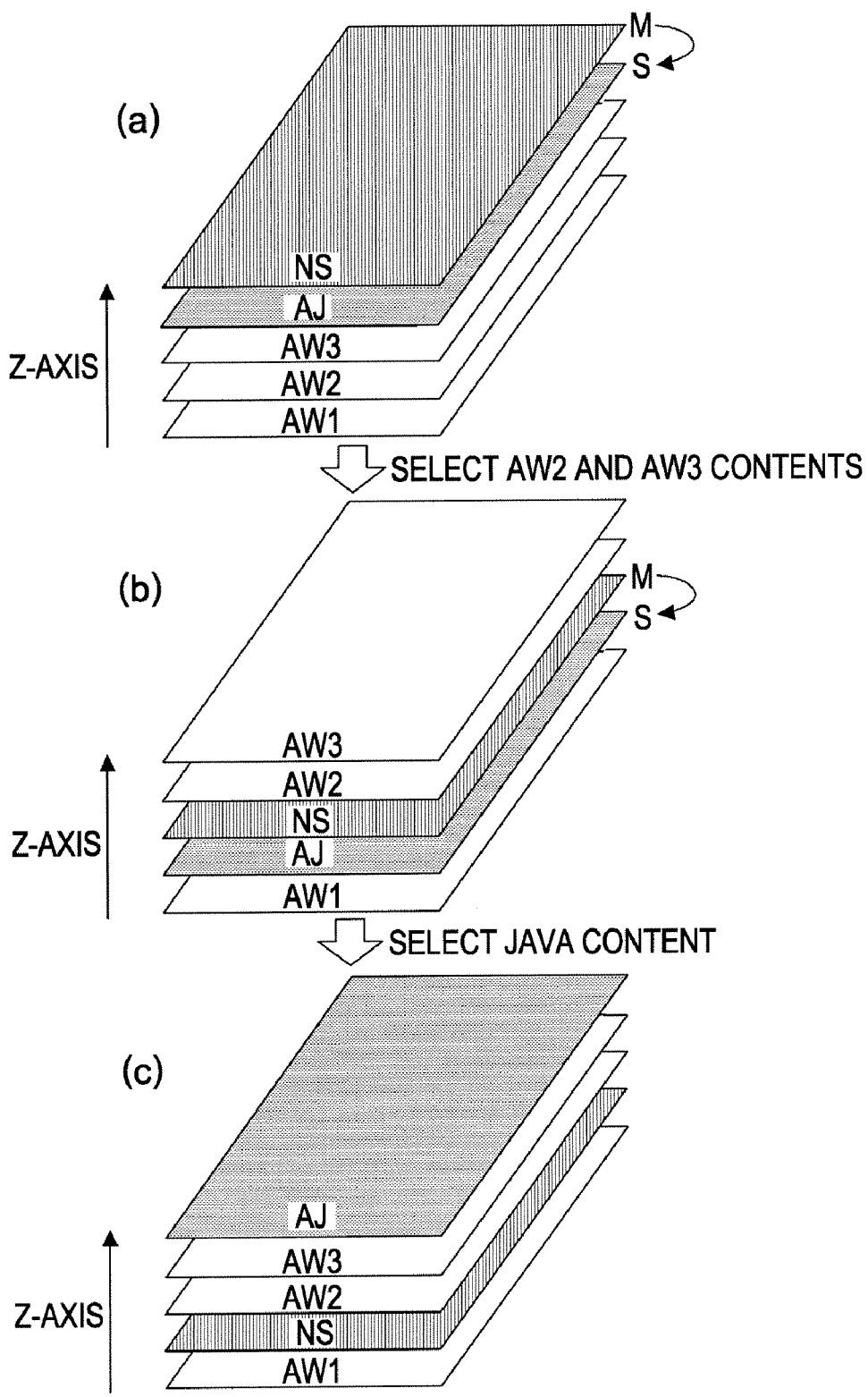
FIG. 14 is a diagram illustrating a screen hierarchy in a state in which master and slave applications are moved with being linked in the screen hierarchy, and in a state in which a master-slave relationship is temporarily released by the selection of a slave application in the second embodiment.
Figure 15:
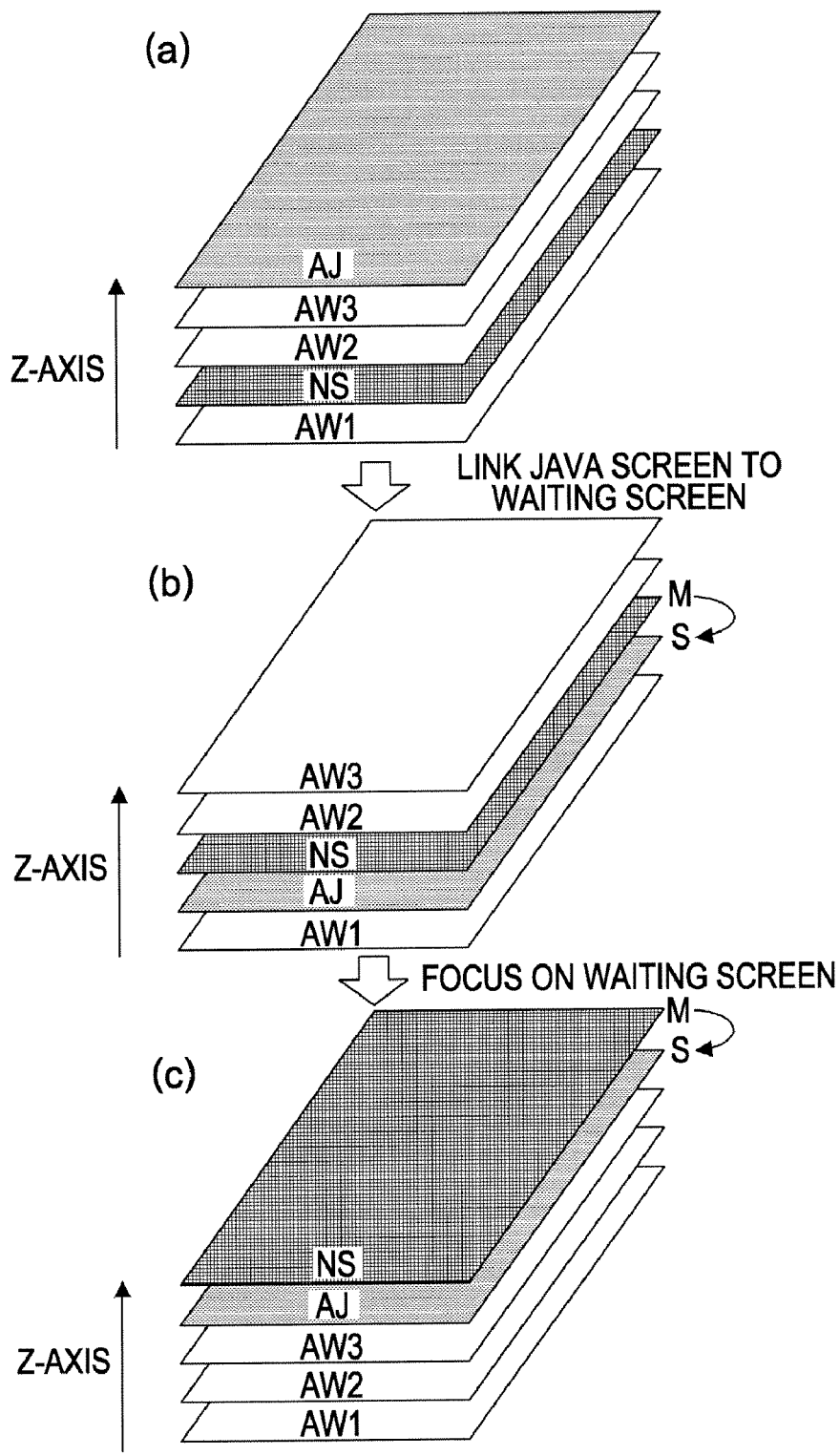
FIG. 15 is a diagram illustrating a screen hierarchy in a state in which a master-slave relationship temporarily released is restored, and in a state in which master and slave applications are moved with being linked in the screen hierarchy in the second embodiment.

In FIG. 14, (a) shows an example of the screen hierarchy in the case where the waiting-screen application NS, the JAVA application AJ, and three other applications AW1 to AW3, thus five applications in total are individually started, for example the waiting-screen application NS is located at the highest level in the screen hierarchy, furthermore the waiting-screen application NS is set to a master M, and the JAVA application AJ is set to a slave S. In this regard, at this time, the screen-hierarchy control function 37 holds the description of the information of screen-hierarchical order of each of the applications in the screen-hierarchy management table described below.

FIG. 14, (b) shows the screen-hierarchical order of each application after the state (a) in FIG. 14 and when the user selects the content of the application AW2, and furthermore the user selects the content of the application AW3. That is to say, in this case, the screen-hierarchy relationship of each application becomes the order of the application AW3, the application AW2, the waiting-screen application NS, the JAVA application AJ, and the application AW1. In this regard, the information of screen-hierarchical order of each application at this time is described and held by the screen-hierarchy control function 37 in the screen-hierarchy management table.

Next, at the time of the screen-hierarchical order of FIG. 14(b), for example if the user selects the content of the JAVA application AJ, the screen-hierarchy control function 37 temporarily releases the master/slave relationship as shown in FIG. 14(c), and moves the JAVA application AJ, which has been activated by the user's selection, to the highest level in the screen hierarchy. Thus, the screen-hierarchy relationship of each application in the case of FIG. 14(c) becomes the order of the JAVA application AJ, the application AW3, the application AW2, the waiting-screen application NS, and the application AW1. The screen-hierarchy control function 37 describes the information of screen-hierarchical order of each of the applications in the screen-hierarchy management table.

Next, at the time of the screen-hierarchical order of FIG. 14(c) and FIG. 15(a), for example, if the user operates the setting to make the JAVA application AJ inactive, the screen-hierarchy control function 37 moves the JAVA application AJ to the level immediately below the application NS of the waiting screen in the screen hierarchy as shown in FIG. 15(b), and performs screen-hierarchy control processing to link to the application NS of the waiting screen. Also, at this time, the screen-hierarchy control function 37 describes the information of the master/slave relationship in the screen-hierarchy management table, and updates the information of the screen-hierarchical order of each application.

After that, when the user operates, for example to display the waiting screen on the display screen, the screen-hierarchy control function 37 moves the application NS of the waiting screen to the highest level in the screen hierarchy as shown in FIG. 15(c), and also moves the JAVA application AJ, which is linked to the application NS of the waiting screen as a slave. Thus, as shown in FIG. 15(c), the screen-hierarchy relationship becomes the order of the waiting-screen application NS, the JAVA application AJ, the application AW3, the application AW2, and the application AW1. Also, at this time, the screen-hierarchy control function 37 updates the description in the screen-hierarchy management table in accordance with the screen-hierarchical order of each of the applications.

Figure 16:
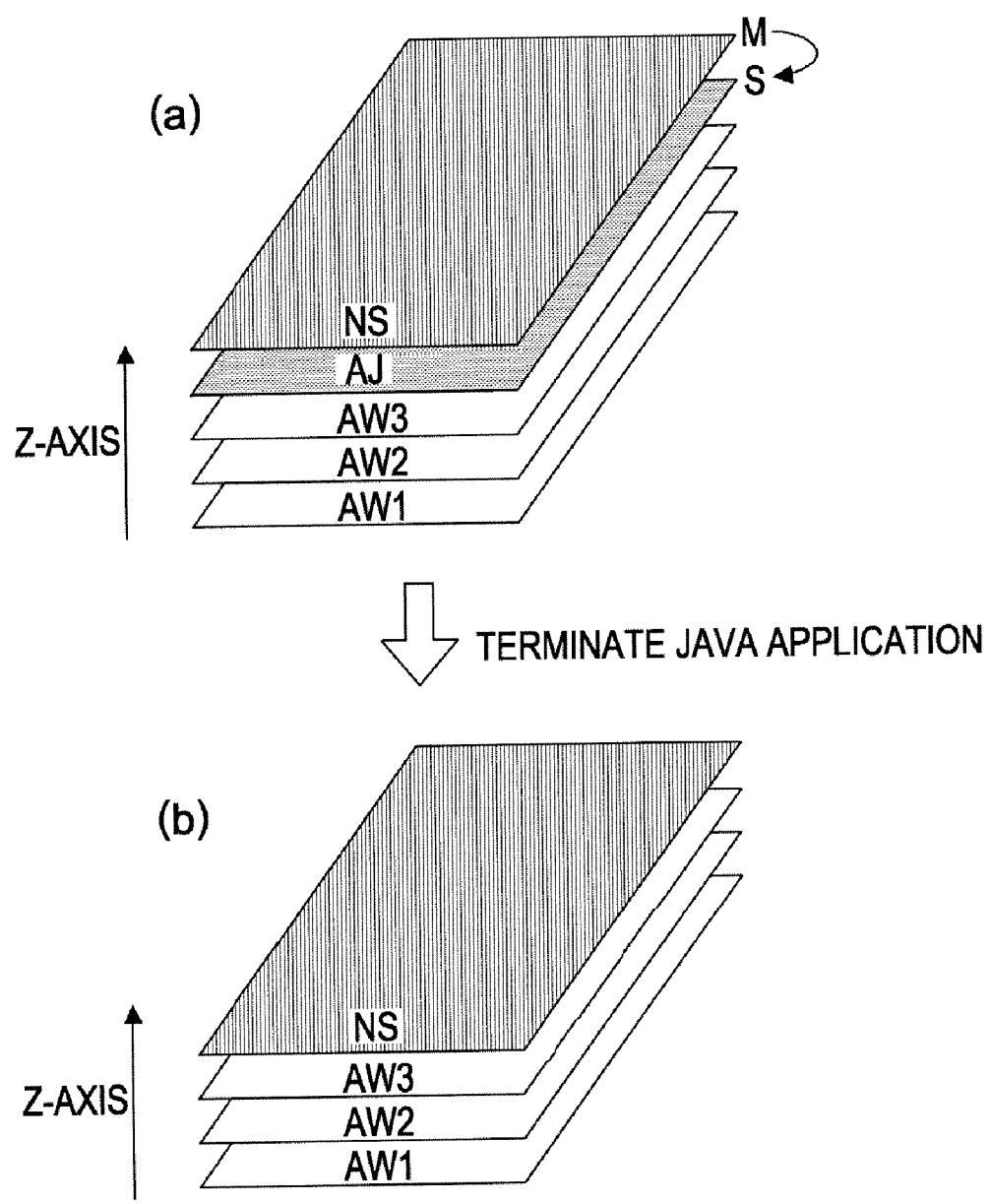
FIG. 16 is a diagram illustrating a screen hierarchy when applications have a master-slave relationship and only a slave application terminates.
Figure 17:
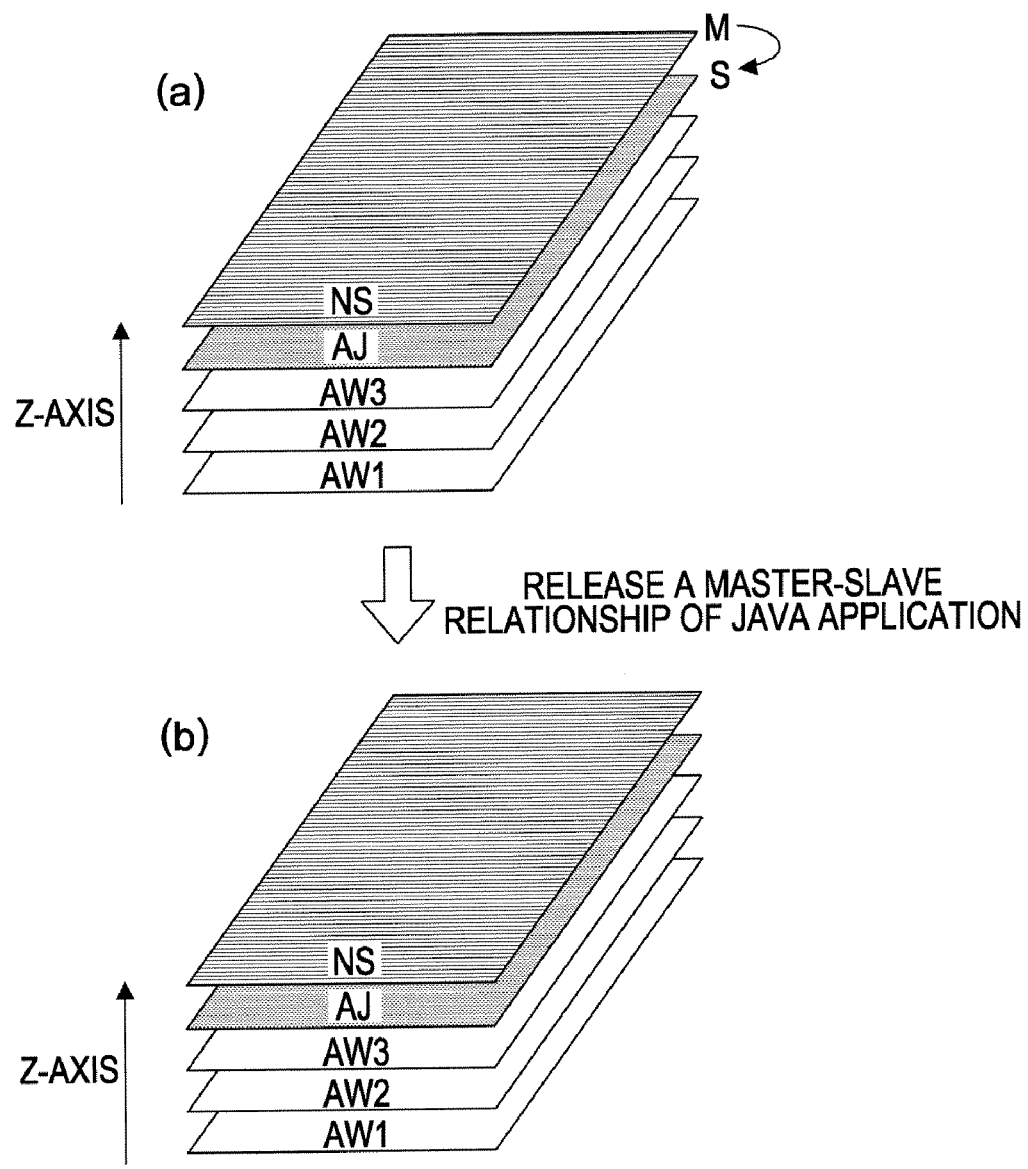
FIG. 17 is a diagram illustrating a screen hierarchy when a master-slave relationship is released.

In this regard, the master/slave relationship is released at the time of FIGS. 16 and 17.

That is to say, for example as shown in FIG. 16(a), when the waiting-screen application NS and the JAVA application AJ have a master/slave relationship, if the JAVA application AJ terminates for some reason, for example, as shown in FIG. 16(b), the master/slave relationship between the waiting-screen application NS and the JAVA application AJ is released. In this regard, if the JAVA application AJ terminates as in this example, as shown in FIG. 16(b), the screen-hierarchical order of each of the applications becomes the order of the waiting-screen application NS, the application AW3, the application AW2, and the application AW1.

Also, for example as shown in FIG. 17(a), when the waiting-screen application NS and the JAVA application AJ have a master/slave relationship, if the instruction to release the master/slave relationship by the setting operation, etc. of the user, for example, as shown in FIG. 17(b), the master/slave relationship between the waiting-screen application NS and the JAVA application AJ is released. In this regard, if only the master/slave relationship is released as in this example, as shown in FIG. 17(b), the screen-hierarchical order of each of the applications becomes the order of the waiting-screen application NS, the JAVA application AJ, the application AW3, the application AW2, and the application AW1. Thus, only the master/slave relationship is released without changing the screen-hierarchical order of FIG. 17(a) in particular.

Screen-Hierarchy Management Table

FIG. 18 illustrates an example of the screen-hierarchy management table used by the screen-hierarchy control function 37. In this regard, the screen-hierarchy management table is stored, for example in the memory section 16 in FIG. 1.

In the screen-hierarchy management table shown in FIG. 18, the table item of "application number" has a description of the identification assigned for each application having a content that can be displayed on the display screen of the display section 19 among each of the applications currently in a started state, for example.

The table item of "hierarchical order" has a description of the information indicating a positional relationship (that is to say, a screen-hierarchical order) of each application in the screen hierarchy by a numeric value when each application identified by the application number is managed in the screen hierarchical order. The application having the lowest value is disposed at the highest level (at the front of the screen) of the screen hierarchy, and an application having a value one higher than that of another application is disposed at the lower hierarchical level (that is to say, at the back of the screen) of the other application. In the case of the example of FIG. 18, the application having the application number of W5 is disposed at the front of the screen. One level lower than that (one level at the back of the screen) becomes the application having the application number of W2. In the following, similarly, one level lower than that becomes the application having the application number of W1, and one level still lower becomes the application having the application number of W3. The lowest level becomes the application having the application number of W4.

The table item of "application number of master side" has a description of the application number to be the master side for the application to be a slave when a master/slave relationship is set between two applications, for example. That is to say, in the case of FIG. 18, the table item of "application number of master side" for the application number W4 has a description of the application number "W3". Thus, the application having the application number of W4 becomes a slave, and its master becomes the application having the application number of W3.

The table item of "application number of slave side" has a description of the application number to be the slave side for the application to be a slave when a master/slave relationship is set between two applications, for example. That is to say, in the case of FIG. 18, the table item of "application number of slave side" for the application number W3 has a description of the application number "W4". Thus, the application having the application number of W3 becomes a slave, and its slave becomes the application having the application number of W4.

The table item of "link to master application specific information" has a description of the link information to the interface of the master application when the slave application makes a specific setting request to the master application in the case where a master/slave relationship is set between two applications, for example.

The table item of "link to slave application specific information" has a description of the link information to the interface of the slave application when the master application makes a specific setting request to the slave application in the case where a master/slave relationship is set between two applications, for example.

In this regard, the master-application specific information and the slave-application specific information include background information (transparency, image, etc.) of the screen.

Screen-Hierarchy Control Flow in Second Embodiment

A description will be given of the processing flow of when the control section 10 of the cellular-phone terminal according to the second embodiment of the present invention starts master/slave applications, and manages and controls a hierarchical relationship of the master/slave applications and the other applications by each function shown in FIG. 2 described above using FIGS. 19 to 22.

Figure 19:
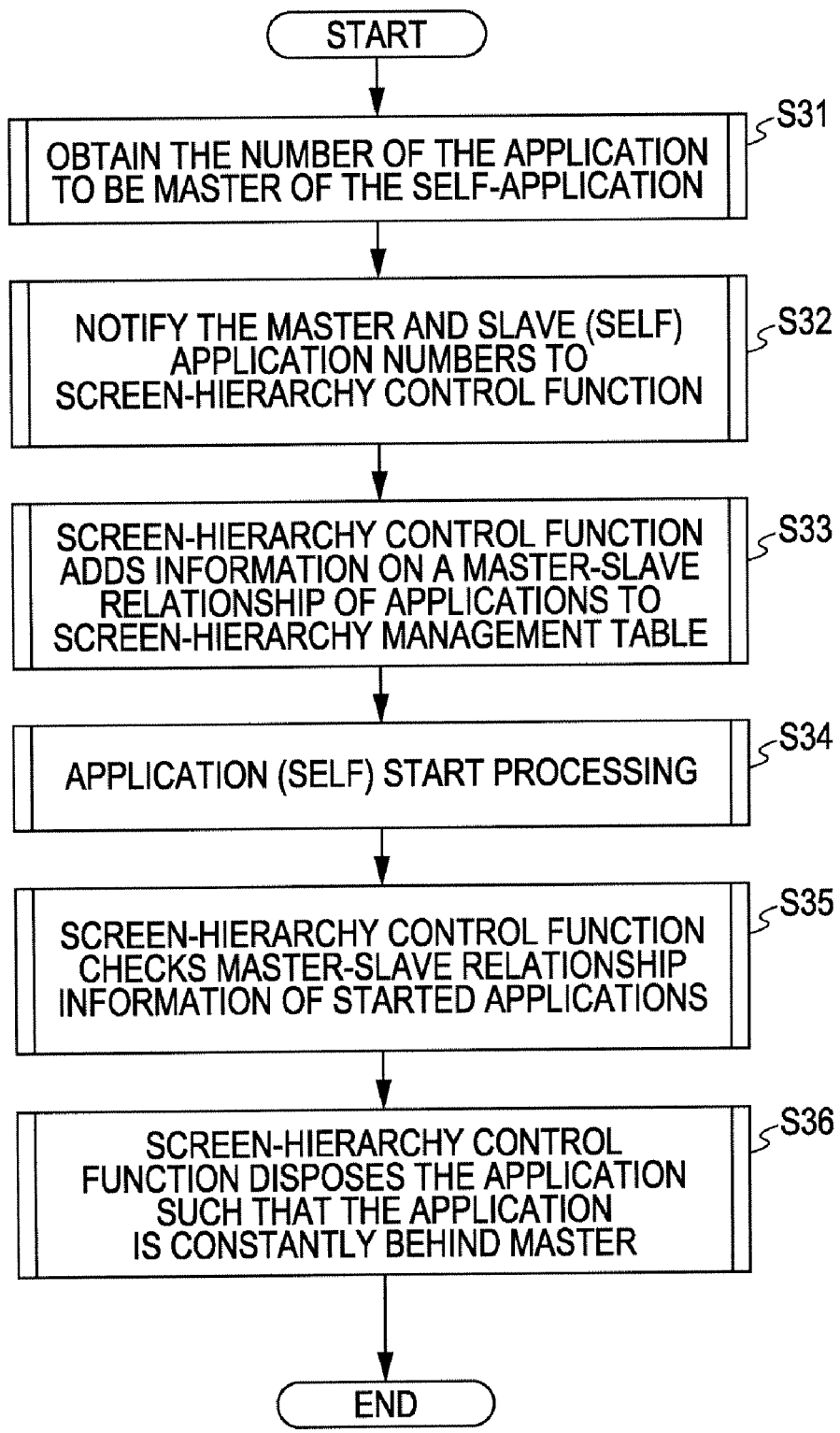
FIG. 19 is a flowchart illustrating the application function processing started as a slave, and the processing of the case where the screen-hierarchy control function controls a screen-hierarchy relationship on the basis of the information from the slave application function.

FIG. 19 illustrates an example of the application function processing started as a slave, and the processing of the case where the screen-hierarchy control function 37 controls a screen-hierarchy relationship on the basis of the information from the slave application function in a master/slave relationship.

In the application function 34 and the application function 36 in FIG. 2, the application started as a slave obtains, as processing in step S31, the number of the application set to be the master of the self application simultaneously with the starting by, for example looking at "the link information to the interface of the master application" in the screen-hierarchy management table stored in the memory section 16 in FIG. 1, etc., for example.

Next, in the processing of step S32, the application started as a slave notifies the self application number, which is the slave side, and the master application number obtained in step S31 to the screen-hierarchy control function 37.

In the processing of step S33, the screen-hierarchy control function 37, which has received the application number, determines a master/slave relationship of both applications from the application number, and describes the master/slave relationship of both applications in the above-described screen-hierarchy management table.

Next, in the processing of step S34, the application started as a slave performs the processing to completely start the self application.

After that, in step S35, the screen-hierarchy control function 37 refers to the description content of the screen-hierarchy management table, and checks a master/slave relationship between the application started as a slave and the application to be a master to that. Next, in step S36, the screen-hierarchy control function 37 disposes the application started as a slave in the back side of the master application all the time, and performs the screen-hierarchy management.

Figure 20:
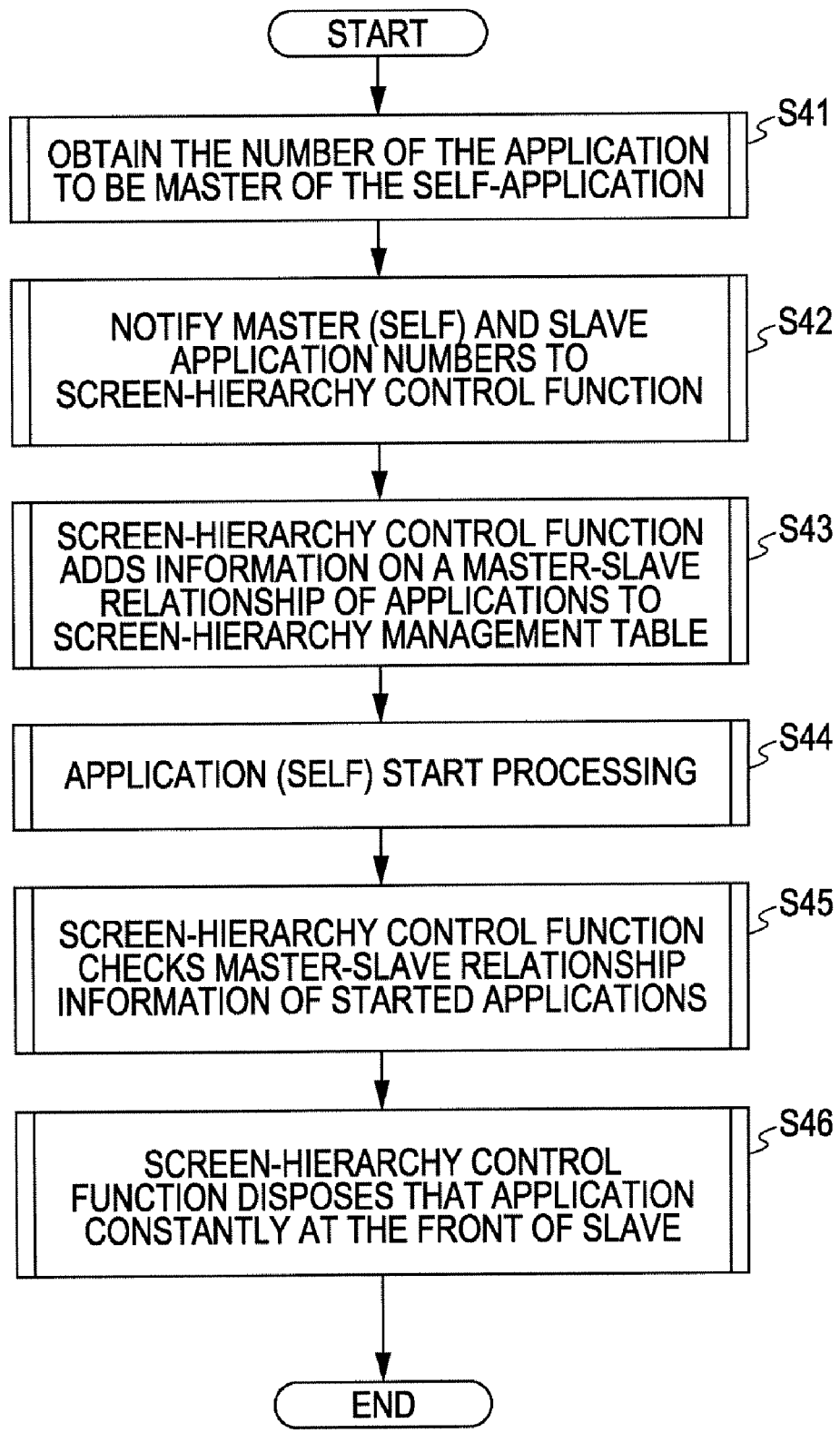
FIG. 20 is a flowchart illustrating the application function processing started as a master, and the processing of the case where the screen-hierarchy control function controls a screen-hierarchy relationship on the basis of the information from the master application function.

FIG. 20 illustrates an example of the flowchart of the application function processing started as a master, and the processing of the case where the screen-hierarchy control function controls the screen-hierarchy relationship on the basis of the information from the master application function.

In the application function 34 and the application function 36 in FIG. 2, the application started as a master obtains, as processing in step S41, the number of the application set to be the slave of the self application simultaneously with the starting by, for example looking at "the link information to the interface of the slave application" in the screen-hierarchy management table stored in the memory section 16, etc., for example.

Next, in the processing of step S42, the application started as a master notifies the self application number, which is the master side, and the slave application number obtained in step S41 to the screen-hierarchy control function 37.

In the processing of step S43, the screen-hierarchy control function 37, which has received the application number, determines a master/slave relationship of both applications from the application number, and describes the master/slave relationship of both applications in the above-described screen-hierarchy management table.

Next, in the processing of step S44, the application started as a master performs the processing to completely start the self application.

After that, in step S45, the screen-hierarchy control function 37 refers to the description content of the screen-hierarchy management table, and checks a master/slave relationship between the application started as a master and the application to be a slave to that. Next, in step S46, the screen-hierarchy control function 37 disposes the application started as a master at the front side of the slave application all the time, and performs the screen-hierarchy management.

FIG. 21 illustrates an example of a processing flowchart of the case where a master-slave relationship is released by the selection of a content of the slave application, and the slave application is moved to the highest level (at the front of the screen) in the screen hierarchy to be focused.

In FIG. 21, when the user selects the content of the slave application through the key-input detection function 33, in step S51, the application function of the control section 10 requests the screen-hierarchy control function 37 to release a master/slave relationship with the master application.

When the screen-hierarchy control function 37 of the control section 10 receives the above-described request of releasing the master/slave relationship, in step S52, the screen-hierarchy control function 37 deletes the information of the master/slave relationship between these applications from the screen-hierarchy management table.

Next, in step S53, the application function, which has been a slave, requests the screen-hierarchy control function 37 to obtain focus on the self application.

When the screen-hierarchy control function 37 receives the request of obtaining the focus, in step S54, the screen-hierarchy control function 37 disposes the application that made a request of obtaining the focus at the highest level (at the front of the screen) in the screen hierarchy.

After that, in step S55, the focus control function 35 of the control section 10 sets focus on the application disposed at the highest level (at the front of the screen) in the screen hierarchy.

As described above, FIG. 22 illustrates an example of a processing flowchart of the case where a master-slave relationship is released once, and then the slave application restores the master-slave relationship with the master application again.

In FIG. 22, when the user inputs a request to select the content of another application, etc., from the slave application having been disposed at the highest level of the screen hierarchy through the key-input processing function 33, the slave application of the control section 10 obtains, as processing in step S61, the number of the application set to be the master of the self application simultaneously with the starting by, for example looking at "the link information to the interface of the master application" in the screen-hierarchy management table stored in the memory section 16 in FIG. 1, etc., for example.

Next, in the processing of step S62, the application which becomes a slave notifies the self application number, which is the slave side, and the master application number obtained in step S61 to the screen-hierarchy control function 37.

In the processing of step S63, the screen-hierarchy control function 37, which has received the application number, determines a master/slave relationship of both applications from the application number, and describes the master/slave relationship of both applications in the above-described screen-hierarchy management table.

Next, in the processing of step S64, the application, which becomes a slave, requests the screen-hierarchy control function 37 to update the screen hierarchy.

After that, in step S65, the screen-hierarchy control function 37 refers to the description content of the screen-hierarchy management table, and checks a master/slave relationship between the application to be a slave and the application to be a master to that. Next, in step S66, the screen-hierarchy control function 37 disposes again the slave application in the back side of the master application all the time, and performs the screen-hierarchy management.

SUMMARY

As described above, a plurality of applications are managed and controlled in a screen hierarchy by the cellular-phone terminal according to an embodiment of the present invention. It becomes therefore possible for the user to change a plurality of applications in two ways seamlessly and promptly by a simple software mechanism without interrupting the user's operation at the time of changing applications.

That is to say, from the user's view, the change of the screens of a cellular-phone terminal is operated not by the change of applications, but by the change of contents. Thus, it is not necessary for the user to be aware of which application should be used in order to display each content as is done up to now. Accordingly, the user-friendliness will be improved. It is therefore possible for the user to concentrate on enjoying the content. On the other hand, from the viewpoint of developing applications, the present invention makes it easily possible to deal with the implementation requests of advanced functions based partly on the software linkage function getting complicated year by year and the software linkage from each operator to a cellular-phone terminal.

Also, in the cellular-phone terminal according to an embodiment of the present invention, a master/slave mechanism for moving applications in a screen hierarchy in a linked state is implemented, for example as an independent mechanism from an application hierarchy structure in a known multitasking function. Thus, for example when the user instructs to change contents, it is possible to achieve the function of changing contents of master/slave applications seamlessly without the user being aware of the master/slave relationship and without the known multi-tasking function to be affected, or with making a minimum modification on the known multi-tasking functions.

In this regard, there have been methods for making it easy to change a plurality of screens by focusing on a relationship between a function hierarchy and a screen display at the time of selecting a function up to date. However, the present invention is a method of making it easy to change a plurality of different applications, and thus is different from a known method of changing functional hierarchy within each application.

The above-described description of the embodiments is an example of the present invention. Thus, the present invention is not limited to the above-described embodiment. Various modifications and alterations are possible depending on design requirements, etc., as a matter of course, without departing from the spirit and scope of the invention.

An information processing apparatus, method, and an information processing program according to the present invention are not limited to the above-described cellular-phone terminal, and can be applied to various mobile terminals, such as a PDA (Personal Digital Assistant), a car navigation system, a mobile AV apparatus, etc., in which control is performed to change a plurality of applications and to move master/slave applications linked with each other in a screen hierarchy.

What is claimed is:

1. An information processing apparatus comprising:
    a display section provided with a screen capable of displaying a content of an application;
    a user-input processing section for acquiring an instruction input from a user; and
    a screen-hierarchy control section for managing a screen hierarchical order of each application when contents of a plurality of started applications are displayed in the display section,
    wherein when one of at least two applications out of a plurality of the applications is set to be a master application and the other of the applications is set to be a slave application, the screen-hierarchy control section disposes and links the slave application at an immediately lower level than that of the master application in the screen hierarchy, and performs screen-hierarchy control such that the master application and the slave application are moved in the screen hierarchy in a state of being linked at the time of updating the screen hierarchy, and when the user inputs an instruction to display the slave application content onto the screen of the display section, the screen-hierarchy control section temporarily releases the linkage between the master and the slave, and sets the slave application content at a highest level of the screen hierarchy.

2. The information processing apparatus according to claim 1, wherein when the slave application set at the highest level of the screen hierarchy is moved to a lower level, the screen-hierarchy control section disposes and re-links the slave application at the immediately lower level than that of the master application in the screen hierarchy.

3. The information processing apparatus according to claim 1, wherein the master application content has a transparent area including at least part of area capable of transparently displaying a lower level of the screen hierarchy.

4. The information processing apparatus according to claim 3, wherein the master application content is a waiting screen content indicating a predetermined processing-waiting state.

5. The information processing apparatus according to claim 1, wherein the master application content is displayed only in part of area on the screen of the display section, and is a content including a drawing of soft keys corresponding to a predetermined operation section for the user to input an instruction.

6. A method of processing information, comprising the steps of:

managing a screen hierarchical order of each application when contents of a plurality of started applications are displayed on a screen of a display section;

when one of at least two applications out of a plurality of the applications is set to be a master application and the other of the applications is set to be a slave application, disposing and linking the slave application at an immediately lower level than that of the master application at the screen hierarchy;

moving the master application and the slave application in a state of being linked at the time of updating the screen hierarchy; and inputting an instruction to display the slave application content onto the screen of the display section, and temporarily releasing the linkage between the master and the slave and setting the slave application content at a highest level of the screen hierarchy.

7. The method of claim 6, wherein when the slave application set at the highest level of the screen hierarchy is moved to a lower level, the method performs disposing and re-linking the slave application at the immediately lower level than that of the master application in the screen hierarchy.

8. The method of claim 6, wherein the master application content has a transparent area including at least part of area capable of transparently displaying a lower level of the screen hierarchy.

9. The method of claim 8, wherein the master application content is a waiting screen content indicating a predetermined processing-waiting state.

10. The method of claim 6, wherein the master application content is displayed only in part of area on the screen of the display section, and is a content including a drawing of soft keys corresponding to a predetermined operation section for the user to input an instruction.

11. A memory device that has stored therein an information processing program that when executed by a processor performs processing as a screen-hierarchy control section, the processing comprising the steps of:

managing by the processor a screen hierarchical order of each application when contents of a plurality of started applications are displayed on a screen of a display section;

when one of at least two applications out of a plurality of the applications is set to be a master application and the other of the applications is set to be a slave application, disposing and linking the slave application at an immediately lower level than that of the master application in the screen hierarchy;

moving the master application and the slave application in a state of being linked at the time of updating the screen hierarchy; and inputting an instruction to display the slave application content onto the screen of the display section, and temporarily releasing the linkage between the master and the slave and setting the slave application content at a highest level of the screen hierarchy.

12. The computer readable medium of claim 11, wherein when the slave application set at the highest level of the screen hierarchy is moved to a lower level, the processing performs disposing and re-linking the slave application at the immediately lower level than that of the master application in the screen hierarchy.

13. The computer readable medium of claim 11, wherein the master application content has a transparent area including at least part of area capable of transparently displaying a lower level of the screen hierarchy.

14. The computer readable medium of claim 13, wherein the master application content is a waiting screen content indicating a predetermined processing-waiting state.

15. The computer readable medium of claim 11, wherein the master application content is displayed only in part of area on the screen of the display section, and is a content including a drawing of soft keys corresponding to a predetermined operation section for the user to input an instruction.

* * * * *